United States Patent
Gilhuly et al.

(10) Patent No.: US 6,701,378 B1
(45) Date of Patent: Mar. 2, 2004

(54) SYSTEM AND METHOD FOR PUSHING INFORMATION FROM A HOST SYSTEM TO A MOBILE DATA COMMUNICATION DEVICE

(75) Inventors: Barry J. Gilhuly, Waterloo (CA); Anh Ngoc Van, Brantford (CA); Steven M. Rahn, Elora (CA); Gary P. Mousseau, Waterloo (CA); Mihal Lazaridis, Waterloo (CA)

(73) Assignee: Research in Motion Limited, Waterloo (CA)

( * ) Notice: Subject to any disclaimer, the term of this patent is extended or adjusted under 35 U.S.C. 154(b) by 0 days.

(21) Appl. No.: 09/401,868

(22) Filed: Sep. 23, 1999

Related U.S. Application Data

(63) Continuation-in-part of application No. 09/087,623, filed on May 29, 1998.

(51) Int. Cl.$^7$ ................................................. G06F 15/16
(52) U.S. Cl. ....................... 709/249; 709/206; 709/207; 709/245; 340/7.21; 340/7.29; 455/556
(58) Field of Search ................................ 709/249, 207, 709/206, 245; 340/7.43, 7.45, 7.21, 7.29; 455/554–557

(56) References Cited

U.S. PATENT DOCUMENTS 4,106,060 A    8/1978   Chapman, Jr.

(List continued on next page.)

FOREIGN PATENT DOCUMENTS

| DE | 19961345 | 12/1999 |
|----|----------|---------|
| EP | 0617373  | 9/1994  |
| EP | 0736989  | 10/1996 |
| EP | 0772327  | 5/1997  |
| EP | 0777394  | 6/1997  |
| EP | 0788287  | 8/1997  |
| EP | 09214556 | 8/1997  |
| EP | 0793387  | 9/1997  |
| EP | 0825788  | 2/1998  |

(List continued on next page.)

OTHER PUBLICATIONS

PR Newswire, "MediaGate and Software.com Partner to Provide Revenue Generating Enhanced Communication Solutions to Internet Service Providers," Aug. 10, 1998, PR Newswire, pp. 1ff.*

(List continued on next page.)

*Primary Examiner*—Glenton B. Burgess
*Assistant Examiner*—Bradley Edelman
(74) *Attorney, Agent, or Firm*—Jones Day; Krishna K. Pathiyal; Charles B. Meyer

(57) ABSTRACT

A system and method for pushing information from a host system to a mobile data communication device upon sensing a triggering event is disclosed. A redirector program operating at the host system enables a user to continuously redirect certain user-selected data items from the host system to the user's mobile data communication device upon detecting that one or more user-defined triggering events has occurred. The redirector program operates in connection with event-generating applications and repackaging systems at the host system to configure and detect a particular user-defined event, and then to repackage the user-selected data items in an electronic wrapper prior to pushing the data items to the mobile device. The mobile data communication device may originate new messages or reply messages to previously received information, such messages being transmitted to a wireless redirector host system, which then transmits a copy of the messages to both the intended recipient and a first electronic mail account associated with the mobile data communication device.

58 Claims, 8 Drawing Sheets

U.S. PATENT DOCUMENTS

| | | |
|---|---|---|
| 4,417,349 A | 11/1983 | Hills et al. |
| 4,438,433 A | 3/1984 | Smoot et al. |
| 4,558,454 A | 12/1985 | Hills et al. |
| 4,644,351 A | 2/1987 | Zabarsky et al. |
| 4,695,880 A | 9/1987 | Johnson et al. |
| 4,697,281 A | 9/1987 | O'Sullivan |
| 4,713,780 A | 12/1987 | Schultz et al. |
| 4,768,087 A | 8/1988 | Taub et al. |
| 4,837,798 A | 6/1989 | Cohen et al. |
| 4,837,800 A | 6/1989 | Freeburg et al. |
| 4,845,658 A | 7/1989 | Gifford |
| 4,856,047 A | 8/1989 | Saunders |
| 4,928,096 A | 5/1990 | Leonardo et al. |
| 4,951,044 A | 8/1990 | Nelson et al. |
| 4,972,457 A | 11/1990 | O'Sullivan |
| 4,980,907 A | 12/1990 | Raith et al. |
| 5,008,926 A | 4/1991 | Misholi |
| 5,043,721 A | 8/1991 | May |
| 5,068,916 A | 11/1991 | Harrison et al. |
| 5,086,502 A | 2/1992 | Malcolm |
| 5,125,021 A | 6/1992 | Lebowitz |
| 5,127,041 A | 6/1992 | O'Sullivan |
| 5,128,981 A | 7/1992 | Tsukamoto et al. |
| 5,136,291 A | 8/1992 | Teague |
| 5,157,660 A | 10/1992 | Kuwahara et al. |
| 5,159,592 A | 10/1992 | Perkins |
| 5,177,680 A | 1/1993 | Tsukino et al. |
| 5,181,200 A | 1/1993 | Harrison |
| 5,210,785 A | 5/1993 | Sato et al. |
| 5,265,033 A | 11/1993 | Vajk et al. |
| 5,283,887 A | 2/1994 | Zachery |
| 5,293,250 A | 3/1994 | Okumura et al. |
| 5,299,255 A | 3/1994 | Iwaki et al. |
| 5,307,059 A | 4/1994 | Connary et al. |
| 5,313,582 A | 5/1994 | Hendel et al. |
| 5,315,635 A | 5/1994 | Kane et al. |
| 5,333,152 A | 7/1994 | Wilber |
| 5,333,266 A | 7/1994 | Boaz et al. |
| 5,370,566 A | 12/1994 | Mitchell, Jr. et al. |
| 5,392,390 A | 2/1995 | Crozier |
| 5,406,557 A | 4/1995 | Baudoin |
| 5,410,543 A | 4/1995 | Seitz et al. |
| 5,416,473 A | 5/1995 | Dulaney, III et al. |
| 5,436,960 A | 7/1995 | Campana, Jr. et al. |
| 5,438,611 A | 8/1995 | Campana, Jr. et al. |
| 5,452,356 A | 9/1995 | Albert |
| 5,479,472 A | 12/1995 | Campana, Jr. et al. |
| 5,493,692 A | 2/1996 | Theimer et al. |
| 5,495,484 A | 2/1996 | Self et al. |
| 5,548,789 A | 8/1996 | Nakanura |
| 5,559,800 A | 9/1996 | Mousseau et al. |
| 5,572,528 A | 11/1996 | Shuen |
| 5,579,472 A | 11/1996 | Keyworth, II et al. |
| 5,588,009 A | 12/1996 | Will |
| 5,598,536 A | 1/1997 | Slaughter, III et al. |
| 5,603,054 A | 2/1997 | Theimer et al. |
| 5,604,491 A | 2/1997 | Coonley et al. |
| 5,604,788 A | 2/1997 | Tett |
| 5,625,670 A | 4/1997 | Campana, Jr. et al. |
| 5,627,829 A | 5/1997 | Gleeson et al. |
| 5,630,060 A | 5/1997 | Tang et al. |
| 5,631,946 A | 5/1997 | Campana, Jr. et al. |
| 5,633,810 A | 5/1997 | Mandal et al. |
| 5,638,450 A | 6/1997 | Robson |
| 5,666,530 A | 9/1997 | Clark et al. |
| 5,666,553 A | 9/1997 | Crozier |
| 5,673,322 A | 9/1997 | Pepe et al. |
| 5,701,423 A | 12/1997 | Crozier |
| 5,705,995 A | 1/1998 | Laflin et al. |
| 5,727,202 A | 3/1998 | Kucala |
| 5,729,735 A | 3/1998 | Meyering |
| 5,737,531 A | 4/1998 | Ehley |
| 5,742,905 A | 4/1998 | Pepe et al. |
| 5,751,971 A | 5/1998 | Dobbins et al. |
| 5,754,954 A | 5/1998 | Cannon et al. |
| 5,757,901 A | 5/1998 | Hiroshige |
| 5,758,088 A | 5/1998 | Bezaire et al. |
| 5,758,150 A | 5/1998 | Bell et al. |
| 5,761,416 A | 6/1998 | Mandal et al. |
| 5,764,639 A | 6/1998 | Staples et al. |
| 5,764,899 A | 6/1998 | Eggleston et al. |
| 5,765,170 A | 6/1998 | Morikawa |
| 5,771,353 A | 6/1998 | Eggleston et al. |
| 5,781,614 A | 7/1998 | Brunson |
| 5,781,901 A | 7/1998 | Kuzma |
| 5,790,790 A | 8/1998 | Smith et al. |
| 5,790,974 A | 8/1998 | Tognazzini |
| 5,796,806 A | 8/1998 | Birckbichler |
| 5,812,671 A | 9/1998 | Ross, Jr. |
| 5,812,773 A | 9/1998 | Norin |
| 5,812,819 A | 9/1998 | Rodwin et al. |
| 5,813,016 A | 9/1998 | Sumimoto |
| 5,815,081 A | 9/1998 | Motohashi |
| 5,819,172 A | 10/1998 | Campana, Jr. et al. |
| 5,819,284 A | 10/1998 | Farber et al. |
| 5,822,434 A | 10/1998 | Caronni et al. |
| 5,826,062 A | 10/1998 | Fake, Jr. et al. |
| 5,838,926 A | 11/1998 | Yamagishi |
| 5,844,969 A | 12/1998 | Goldman et al. |
| 5,850,219 A | 12/1998 | Kumomura |
| 5,850,444 A | 12/1998 | Rune |
| 5,862,321 A | 1/1999 | Lamming et al. |
| 5,867,660 A | 2/1999 | Schmidt et al. |
| 5,878,434 A | 3/1999 | Draper et al. |
| 5,881,235 A | 3/1999 | Mills |
| 5,903,723 A | 5/1999 | Beck et al. |
| 5,905,777 A | 5/1999 | Foladare et al. |
| 5,917,629 A | 6/1999 | Hortensius et al. |
| 5,928,329 A | 7/1999 | Clark et al. |
| 5,937,161 A | 8/1999 | Mulligan et al. |
| 5,943,426 A | 8/1999 | Frith et al. |
| 5,951,636 A | 9/1999 | Zerber |
| 5,953,322 A | 9/1999 | Kimball |
| 5,958,006 A | 9/1999 | Eggleston et al. |
| 5,961,590 A | 10/1999 | Mendez et al. |
| 5,966,663 A | 10/1999 | Gleason |
| 5,968,131 A | 10/1999 | Mendez et al. |
| 5,969,636 A | 10/1999 | Parvulescu et al. |
| 5,973,612 A | 10/1999 | Deo et al. |
| 5,974,180 A | 10/1999 | Schwendeman |
| 5,974,238 A | 10/1999 | Chase, Jr. |
| 5,978,689 A | 11/1999 | Tuoriniemi et al. |
| 5,978,837 A | 11/1999 | Foladare et al. |
| 5,983,073 A | 11/1999 | Ditzik |
| 5,987,100 A * | 11/1999 | Fortman et al. ......... 379/88.14 |
| 5,995,597 A | 11/1999 | Woltz et al. |
| 6,000,000 A | 12/1999 | Hawkins et al. |
| 6,006,274 A | 12/1999 | Hawkins et al. |
| 6,009,173 A | 12/1999 | Sumner |
| 6,014,429 A | 1/2000 | LaPorta et al. |
| 6,023,700 A | 2/2000 | Owens et al. |
| 6,023,708 A | 2/2000 | Mendez et al. |
| 6,034,621 A | 3/2000 | Kaufman |
| 6,052,442 A | 4/2000 | Cooper et al. |
| 6,052,563 A | 4/2000 | Macko |
| 6,052,735 A | 4/2000 | Ulrich et al. |
| 6,058,431 A | 5/2000 | Srisuresh et al. |
| 6,067,561 A | 5/2000 | Dillon |
| 6,072,862 A | 6/2000 | Srinivasan |
| 6,073,137 A | 6/2000 | Brown et al. |
| 6,073,165 A | 6/2000 | Narasimhan et al. |

| | | | |
|---|---|---|---|
| 6,078,826 A | 6/2000 | Croft et al. | |
| 6,085,192 A | 7/2000 | Mendez et al. | |
| 6,085,232 A | 7/2000 | Kikinis | |
| 6,091,951 A | 7/2000 | Sturniolo et al. | |
| 6,092,114 A | 7/2000 | Shaffer et al. | |
| 6,092,191 A | 7/2000 | Shimbo et al. | |
| 6,101,531 A | 8/2000 | Eggleston et al. | |
| 6,112,244 A | 8/2000 | Moore et al. | |
| 6,115,394 A | 9/2000 | Balachandran et al. | |
| 6,115,736 A | 9/2000 | Devarakonda et al. | |
| 6,115,754 A * | 9/2000 | Landgren | 709/249 |
| 6,125,281 A | 9/2000 | Wells et al. | |
| 6,125,369 A | 9/2000 | Wu et al. | |
| 6,130,892 A | 10/2000 | Short et al. | |
| 6,131,096 A | 10/2000 | Ng et al. | |
| 6,131,116 A | 10/2000 | Riggins et al. | |
| 6,141,690 A | 10/2000 | Weiman | |
| 6,144,997 A | 11/2000 | Lamming et al. | |
| 6,151,606 A | 11/2000 | Mendez | |
| 6,157,318 A | 12/2000 | Minata | |
| 6,157,630 A * | 12/2000 | Adler et al. | 370/338 |
| 6,157,950 A | 12/2000 | Krishman | |
| 6,163,274 A | 12/2000 | Lindgren | |
| 6,167,379 A | 12/2000 | Dean et al. | |
| 6,170,057 B1 | 1/2001 | Inoue et al. | |
| 6,178,331 B1 | 1/2001 | Holmes et al. | |
| 6,185,551 B1 * | 2/2001 | Birrell et al. | 707/3 |
| 6,185,603 B1 | 2/2001 | Henderson et al. | |
| 6,195,533 B1 * | 2/2001 | Tkatch et al. | 340/7.29 |
| 6,202,086 B1 * | 3/2001 | Maruyama et al. | 709/206 |
| 6,203,192 B1 * | 3/2001 | Fortman | 379/88.14 |
| 6,219,694 B1 | 4/2001 | Lazaridis et al. | |
| 6,233,341 B1 | 5/2001 | Riggins | |
| 6,240,088 B1 | 5/2001 | Gayton et al. | |
| 6,249,820 B1 | 6/2001 | Dobbins et al. | |
| 6,256,666 B1 | 7/2001 | Singhal | |
| 6,263,201 B1 * | 7/2001 | Hashimoto et al. | 455/403 |
| 6,263,202 B1 * | 7/2001 | Kato et al. | 455/418 |
| 6,272,545 B1 | 8/2001 | Flanagin et al. | |
| 6,275,848 B1 | 8/2001 | Arnold | |
| 6,275,850 B1 | 8/2001 | Beyda et al. | |
| 6,289,212 B1 * | 9/2001 | Stein et al. | 455/412.1 |
| 6,292,668 B1 | 9/2001 | Alanara et al. | |
| 6,311,282 B1 | 10/2001 | Nelson et al. | |
| 6,313,734 B1 * | 11/2001 | Weiss et al. | 340/7.29 |
| 6,314,519 B1 | 11/2001 | Davis et al. | |
| 6,324,544 B1 | 11/2001 | Alam et al. | |
| 6,324,587 B1 | 11/2001 | Trenbeath et al. | |
| 6,356,956 B1 | 3/2002 | Deo et al. | |
| 6,400,958 B1 | 6/2002 | Isomursu et al. | |
| 6,442,589 B1 * | 8/2002 | Takahashi et al. | 709/203 |
| 6,449,287 B1 | 9/2002 | Leuca et al. | |
| 6,470,358 B1 | 10/2002 | Beyda et al. | |
| 6,487,560 B1 | 11/2002 | LaRue et al. | |
| 2001/0001552 A1 | 5/2001 | Vong et al. | |
| 2001/0015977 A1 | 8/2001 | Johansson | |
| 2001/0029531 A1 | 10/2001 | Ohta | |
| 2001/0040693 A1 | 11/2001 | Saito et al. | |
| 2001/0042093 A1 | 11/2001 | Shirai et al. | |
| 2001/0045885 A1 * | 11/2001 | Tett | 340/7.2 |
| 2001/0054072 A1 | 12/2001 | Discolo et al. | |
| 2002/0059380 A1 | 5/2002 | Biliris et al. | |

FOREIGN PATENT DOCUMENTS

| | | | | | |
|---|---|---|---|---|---|
| EP | | 0838774 | 4/1998 | | |
| EP | | 0838934 | 4/1998 | | |
| EP | | 0772327 | 2/1999 | | |
| EP | | 0918417 | 5/1999 | | |
| EP | | 0930766 | 7/1999 | | |
| EP | | 0986225 | 3/2000 | | |
| WO | | 9619064 | 6/1996 | | |
| WO | | 9741654 | 6/1997 | | |
| WO | | 9726709 | 7/1997 | | |
| WO | | 9727717 | 7/1997 | | |
| WO | WO 97/28518 | * | 8/1997 | | G08B/5/22 |
| WO | | 9732251 | 9/1997 | | |
| WO | | 9733421 | 9/1997 | | |
| WO | | 9741654 | 11/1997 | | |
| WO | | 9744942 | 11/1997 | | |
| WO | | 98007897 | 1/1998 | | |
| WO | | 9821911 | 5/1998 | | |
| WO | | 9823108 | 5/1998 | | |
| WO | | 9826344 | 6/1998 | | |
| WO | | 9848560 | 10/1998 | | |
| WO | | 9905620 | 2/1999 | | |
| WO | | 9905813 | 2/1999 | | |
| WO | | 9906900 | 2/1999 | | |
| WO | | 9912365 | 3/1999 | | |
| WO | | 9917505 | 4/1999 | | |
| WO | | 9919988 | 4/1999 | | |
| WO | | 9936870 | 7/1999 | | |
| WO | | 9945484 | 9/1999 | | |
| WO | | 9945684 | 9/1999 | | |
| WO | | 9948312 | 9/1999 | | |
| WO | | 9950974 | 10/1999 | | |
| WO | | 9963709 | 12/1999 | | |
| WO | | 0011567 | 3/2000 | | |
| WO | | 0011832 | 3/2000 | | |
| WO | | 0020994 | 4/2000 | | |
| WO | WO 00/49819 | * | 8/2000 | | H04Q/7/22 |
| WO | WO 01/01264 | * | 1/2001 | | G06F/13/38 |
| WO | | 0113572 | 2/2001 | | |
| WO | | 0113656 | 2/2001 | | |
| WO | | 0141472 | 6/2001 | | |
| WO | | 0167716 | 9/2001 | | |
| WO | | 0171539 | 9/2001 | | |

OTHER PUBLICATIONS

Motorola, "AirMobile™ Wireless Comm Guide for cc:Mail" User Guide Version 1.0, Motorola Wireless Data Group, 1995, pp. 3–48.

Motorola, "AirMobile™ Wireless Comm Server for cc:Mail" User Guide Version 1.1, Motorola Wireless Data Group, 1995, pp. 4–46.

Sun Microsystems, JavaMail API Design Specification, Version 1.0, Dec. 9, 1997, Sun Microsystems, Inc. chapters 1–10 appendices A–E.

Compaq, Zero 2100 Series Color Palm–size PC Reference Guide, Second Edition, Aug. 1999, Compaq Corporation.

Gadol, Steve, et al. "Nomadic Tenets—A User's Perspective," Sun Microsystems Laboratories, Inc., pp. 1–16 (Jun. 1994).

Declaration of David A. Keeney regarding SAM System, pp. 1–33 (Sep. 3, 2002).

"SAM™ integrates E–mail, Alpha Paging, Fax, and more!", SAM System for Automated Messages (10 pgs.).

SAMpage Manual, version 2.0, TeckNow! (Feb. 1990).

Reiter, Alan A., "Focus on Technology," Telocator (Jan. 1990) (4 pgs).

Kuehn, Carl, "More than EMail," Southwest Computer & Business Equipment Review, vol. VII, No. 2, (Feb. 1990) (1 pg.).

SAM System for Automated Messages User's Manual (1988) (17 pgs.).

Motorola Operating Instructions for Your "PMR 2000" Series Display Radio Pagers Personal Message Center (2000) (7 pgs.).

Motorola PMR 2000 Personal Message Receiver POCSAG (CCIR Radio Paging Code #1) (1986) (6 pgs.).

Undated, Information Display Pager D40, NEC Corporation (6 pgs.).

SAM Reference Manual, System for Automated Messages (Sep. 1989).

IBM Portable Terminal User's Guide, Third Edition (Jun. 1985).

Binder, Richard et al, The Alohanet Menehune, University of Hawaii, Version II (Sep. 1974).

Computer Structure—Principles and Examples, McGraw Hill (1982).

Krebs, Jay, Portable Computer and Host Talk Over Radio–Frequency Link, Electronic, pp. 142–145 (Aug. 25, 1983_.

Briere, Daniel, et al., "One Mailbox, Just Like Old Times," Network World, vol. 14, issue 16, p. 21 (Apr. 21, 1997).

News Release, "Motorola Rings in 1995 with the Launch of the Marco® Wireless Communicator," Jan. 4, 1995 (4 pgs.).

Timeline, "FLEX™ Technology Timeline," (3 pgs.).

General Magic, Inc., Corporate Backgrounder, 2001 (2 pgs.).

Pegasus Email Settings, ABSnet Internet Services, Inc. (4 pgs.).

Motorola, Inc., emailVClient, 2001 (4 pages).

News Release, "Motorola Announces Pagewriter 250, The World's Smallest Pager with Full Keyboard", Feb. 27, 1997 (2 pgs).

Dewey, Barney, "Communications Strategies for Newton 2.0," Newton Technology Journal, p. 10, Jun. 1996.

Press Release, "Motorola Announces New Solutions to Provide Consumers with Wireless Access to Personal and Enterprise E–mail Accounts," Mar. 21, 2001 (4 pgs.).

"Motorola's 'Marco' Wireless Communicator," http://www.msu.edu/–luckie/gallery/marco.htm. Jun. 14, 2001 (3 pgs.).

News Release, "CE Software Announces MobileVision," Editorial Contacts, CE Software, Inc., 1995 (3 pgs.).

News Release, "CE Software Ships MobileVision," Jun. 20, 1995 (3 pgs.).

Newton Reference, Communications, 1996–1997(4 pgs.).

PC Pro Issue 31: Realworld Computing, PDA Column, Jul. 30, 1997 (7 pgs.).

Enterprise Solutions for Email Overload, Founder Publications, htt://www.amikanow.com/corporte/publications.htm, Aug. 6, 2001 (9 pgs.).

"Motorola's 'Marco' Wireless Communicator," http://www.msu.edu/–luckie/gallery/marco.htm, Aug. 6, 2001 (2 pgs.).

Press Release, "Apple Agrees to License Newton Technology to Schlumberger, Digital Ocean," Nov. 3, 1995 (3 pgs.).

Frezza, Bill, "PDA, PDA, Wherefore Art Thou, PDA?", Freewire, Aug. 6, 2001 (6 pgs.).

Black, Lauren, et al., "Personal Digital Assistants,"Macworld Reviews, Aug. 6, 2001 (5 pgs.).

Reference, "MobileVision Direct Wireless Connection to Your LAN–Based Electronic Mailbox," CE Software, Inc., pp. 1, 3, 5, 7, 9, 11, 13, 15, 17, 19, 21, 1995.

User Manual, "MobileVision Direct Wireless Connection to Your LAN–Based Electronic Mailbox," CE Software, Inc. 1995.

Johnson, David D., "Ubiquitous Mobile Host Internetworking," Fourth Workshop on Workstation Operating Systems, pp. 85–90, Oct. 14–15, 1993.

Johnson, David B., "Mobile Host Internetworking Using IP Loose Source Routing," School of Computer Science, Carnegie Mellon University, pp. 1–14 Feb. 1993.

Schoettle, Bob, "IP–Address Management on LANs," Byte, pp. 199–200, Feb. 1996.

Cheshire, Stuart, et al., "Internet Mobility 4×4," Computer Science Department, Stanford University, pp. 1–12, Aug. 1996.

Yeom, Hoen Y., et al., "IP Mutliplexing by Transparent Port–Address Translator," Proceedings of the Tenth USENIX System Administration Conference, pp. 113–122, Sep. 29–Oct. 4, 1996.

Johnson, David B., "Scalable and Robust Internetwork Routing for Mobile Hosts," IEEE Computer Society, pp. 2–11, 1994.

Perkins, Charles, "IMHP: A Mobile Host Protocol for the Internet," Computer Networks and ISDN System, vol. 27, pp. 479–491, 1994.

Proceedings of the IEEE 7th International Workshop on Network and Operating System Support for Digital Audio and Video Innsbrook Estates Conference Center, May 19–21, 1997, pp. 135–146.

Lucent Technologies, Bell Labs Technical Journal, vol. 2, No. 3, pp. 152–163, Summer 1997.

Lavana, Hemang, et al., Internet–Based Workflows: A Paradigm for Dynamically Reconfigurable Desktop Environments, Group 97, pp. 204–213, 1997.

Perkins, Charles E., et a l., "Mobility Support in IPv6," Mobicom 96, pp., 27–37, 1996.

Goldszmidt, German, et al., "ShockAbsorber: A TCP Connection Router," IEEE, vol. 3, pp. 1919–1923, 1997.

Egevang, K. et al., "The IP Network Address Translator," Network Working Group, pp. 1–10, May 1994.

Manual, "Server and BBS Software for the Packet Radio" by Jean Paul Roubelat, pp. 1–173.

Book, "Internetwork Mobility The CDPD Approach," by Mark S. Taylor, William Waung, and Mohsen Banan, Jun. 11, 1996.

Padwick, et al., Special Edition Using Microsoft Outlook 97, 1997, Que Corporation, pp. 250–251, 353–367.

Feibus, "A Desktop In Your Palm", Informationweek, Aug. 25, 1997, pp. 65ff.

Behr, "Handheld Solutions", Informationweek, Oct. 27, 1997, pp. 106–113.

Copy of DTS Wireless Website located at D.R.L. http://www.dtswireless.com.

"3Com PalmPilot Gets Wireless Link for E–Mail", Spooner, John G., PC Week, Dec. 8, 1997.

"Have Your Pager Call My Pager", Sullivan, Kristina B., PC Week, Dec. 8, 1997.

Gifford, David K., et al., "The Application of Digital Broadcast Communication to Large Scale Information Systems." IEEE Journal on Selected Areas in Communications, vol. SAC–3, No. 3, pps. 457–467 (May 1985).

Gifford, David K., et al., "An Architecture for Large Scale Information Systems," ACM, pps. 161–170 (1985).

"BlackBerry Technical White Paper," Research in Motion Ltd., Version 1.0, 1998–1999.

Newsletter, "Battery Friendly Bulletin," Volume 1, Issue 3, pp. 1–7 and unnumbered page, 1999.

Article, Comerford, "Handhelds Duke It Out for the Internet," Wireless Internet, pp. 35–38 and 41, Aug. 2000.

Press Detail, "Extended Systems and Motorola Bring Short-Range Wireless to the Paging E–volution," Jan. 13, 2000 (3 pgs.).

Press Detail, "3Com Corporation Licenses Bluetooth Technology from Extended Systems," Feb. 22, 2000 (2 pgs.).

Web site Article, Hawaleshka, "The Web in Your Pocket," Maclean's, May 15, 2000 (3 pgs.).

Claxton, "Messaging API's for Voice Networks," Telecommunications, pp. 116–120, 1998.

* cited by examiner

SYSTEM AND METHOD FOR PUSHING INFORMATION FROM A HOST SYSTEM TO A MOBILE DATA COMMUNICATION DEVICE

This is a continuation-in-part of application No. 09/087,623, filed May 29, 1998.

BACKGROUND OF THE INVENTION

1. Field of the Invention

The present invention is directed toward the field of replicating information from a host system where the information is normally stored to a mobile data communication device. In particular, the system and method of the present invention provide an event-driven redirection computer program ("redirector program") operating at the host system, which, upon sensing a particular user-defined event has occurred, redirects user-selected data items (or parts thereof) from the host system to the user's mobile data communication device. The mobile data communication device is preferably coupled to the host system via a wireless network and one or more landline networks. Due to the bandwidth limitations of wireless networks, only a part of a user-selected data item is generally redirected to the user's mobile device, with the user given the option of then retrieving the entire data item (or some other part of the data item) from the host system.

2. Description of the Related Art

Present systems and methods for replicating information from a host system to a user's mobile data communication device are typically "synchronization" systems in which the user's data items are warehoused (or stored) at the host system for an indefinite period of time until the user synchronizes the mobile device to the host system. In these types of systems and methods, when replication of the warehoused data items to the mobile device is desired, the user typically places the mobile device in an interface cradle that is electrically connected to the host system via some form of local, dedicated communication, such as a serial cable or an infrared or other type of wireless link. Software executing on the mobile data communication device then transmits commands via the local communications link to the host system to cause the host to begin transmitting the user's data items for storage in a memory bank of the mobile device.

In these synchronization schemes, the mobile unit "pulls" the warehoused information from the host system in a batch-mode each time the user desires to replicate information between the two devices. Thus, the two systems (host and mobile) maintain the same data items only after a user-initiated synchronization sequence.

A general problem with these synchronization systems is the fact that the data in the mobile device is only current at the moment of synchronization with the host. Five minutes later a new message could be sent to the user, but the user would not receive that message until the next time the systems are synchronized. Thus, a user may fail to respond to an emergency update or message because the user only periodically synchronizes the system, such as once per day.

Other problems with these systems include: (1) the amount of data to be reconciled between the host and the mobile device can become large if the user does not "synchronize" on a is daily or hourly basis, leading to bandwidth difficulties, particularly when the mobile device is communicating via a wireless packet-switched network; and (2) reconciling large amounts of data, as can accrue in these batch-mode synchronization systems, can require a great deal of communication between the host and the mobile device, thus leading to a more complex, costly and energy-inefficient system.

Thus, there is a general need in this field for a more automated, continuous, efficient, flexible, and reliable system of ensuring that user data items are replicated (in real time) at the user's mobile device.

SUMMARY OF THE INVENTION

A system and method for pushing information from a host system to a mobile data communication device upon sensing a triggering event is provided. A redirector program operating at the host system enables a user to continuously redirect certain user-selected data items from the host system to the user's mobile data communication device upon detecting that one or more user-defined triggering events has occurred. The redirector program operates in connection with event generating applications and repackaging systems at the host system to configure and detect a particular user-defined event, and then to repackage the user-selected data items in an electronic wrapper prior to pushing the data items to the mobile device.

Using the redirector program, the user can select certain data items for redirection, such as E-mail messages, calendar events, meeting notifications, address entries, journal entries, personal reminders etc. Having selected the data items for redirection, the user can then configure one or more event triggers to be sensed by the redirector program, which then initiates redirection of the user data items upon sensing one or more of the event triggers. These user-defined trigger points (or event triggers) may be external events, internal events or networked events. Once an event has triggered redirection of the user data items, the host system then repackages these items in a manner that is transparent to the mobile data communication device, so that information on the mobile device appears similar to information on the user's host system.

The redirector program also provides a set of software-implemented control functions for determining the type of mobile data communication device and its address, for programming a preferred list of message types that are to be redirected, and for determining whether the mobile device can receive and process certain types of message attachments, such as word processor or voice attachments. The mobile device control functions are initially set by the user of the mobile device at the host system. These functions can then be altered on a global or per message basis by transmitting a command message from the mobile device to the host system.

In an alternative embodiment, the redirector program executes on a network server, and the server is programmed to detect numerous redirection event triggers over the network from multiple user desktop computers coupled to the server via a local-area-network ("LAN"). The server can receive internal event triggers from each of the user desktops via the network, and can also receive external event triggers, such as messages from the users' mobile data communication devices. In response to receiving one of these triggers, the server redirects the user's data items to the proper mobile data communication device. This alternative configuration could also include an Internet or Intranet-located web server including the redirector program that could be accessible through a secure Web page or other user interface. In this configuration, the redirector program could be located on an Internet Service Provider's ("ISP's") system, and the user would configure (and reconfigure) the program controls over an Internet connection to the ISP's system.

In another embodiment, the redirector program operates at both the host system and at the user's mobile data communication device. In this configuration, the user's mobile device operates similarly to the host system described below, and is configured in a similar fashion to push certain user-selected data items from the mobile device to the user's host system (or some other computer) upon detecting an event trigger at the mobile device. This configuration provides two-way pushing of information from the host to the mobile device and from the mobile device to the host.

The primary advantage of the present invention is that it provides a system and method for triggering the continuous and real-time redirection of user-selected data items from a host system to a mobile data communication device. Other advantages of the present invention include: (1) flexibility in defining the types of user data to redirect, and in defining a preferred list of message types that are to be redirected or preferred senders whose messages are to be redirected; (2) flexibility in configuring the system to respond to numerous internal, external and networked triggering events; (3) transparent repackaging of the user data items in a variety of ways such that the mobile data communication device appears as though it were the host system; (4) integration with other host system components such as E-mail, TCP/IP, keyboard, screen saver, Web pages and certain programs that can either create user data items or be configured to provide trigger points; and (5) the ability to operate locally on a user's desktop system or at a distance via a network server or through a secure Internet connection.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE DRAWINGS

Figure 1:
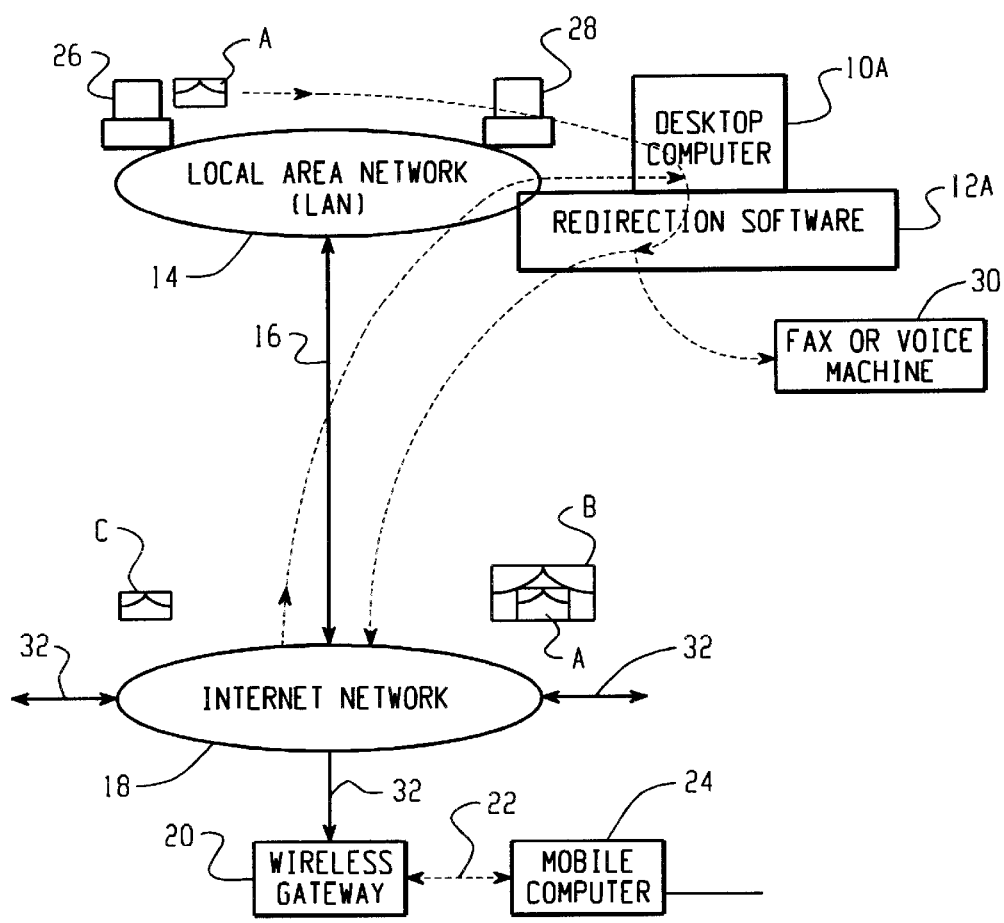
FIG. 1 is a system diagram showing the redirection of user data items from a user's desktop PC (host system) to the user's mobile data communication device, where the redirector software is operating at the user's desktop PC.

Referring now to the drawings, FIG. 1 is an example system diagram showing the redirection of user data items (such as message A or C) from a user's desktop PC (host system) 10A to the user's mobile data communication device 24, where the redirector software 12 is operating at the user's PC 10A. As used in this application, the term "host system" refers to the computer where the redirector software is operating. In the preferred embodiment, the host system is a user's desktop PC 10A. Alternatively, however, the host system could be a network server (10B, see FIG. 2) connected to the user's PC via a local-area network ("LAN"), or it could be a Web server (240, see FIG. 6) operating through a secure network connection or operating at an external ISP, or the host system could be any other system that is capable of communicating with the user's desktop PC.

Message A in FIG. 1 represents an internal message sent from desktop 26 to the user's host system 10A via LAN 14. Message C in FIG. 1 represents an external message from a sender that is not directly connected to LAN 14, such as the user's mobile data communication device 24, some other user's mobile device (not shown), or any user connected to the Internet 18. Message C also represents a command message from the user's mobile data communication device 24 to the host system 10A. As described in more detail in FIG. 3, the desktop host system 10A preferably includes, along with the typical hardware and software associated with a workstation or desktop computer, the redirector program 12, a TCP/IP subsystem 42, a primary message store 40, an E-mail subsystem 44, a screen saver subsystem 48, and a keyboard subsystem 46.

In FIG. 1, the host system 10A is the user's desktop system, typically located in the user's office. The desktop host system 10A is connected to a LAN 14, which also connects to other computers 26, 28 that may be in the user's office or elsewhere. The LAN 14, in turn, is connected to a wide area network ("WAN") 18, preferably the Internet, which is defined by the use of the Transmission Control Protocol/Internet Protocol ("TCP/IP") to exchange information, but which, alternatively, could be any other type of WAN. The connection of the LAN 14 to the WAN 18 is via high bandwidth link 16, typically a T1 or T3 connection. The WAN 18 in turn is connected to a variety of gateways 20, via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless mobile data communication devices 24. Also shown in FIG. 1 is machine 30, which could be a FAX machine, a printer, a system for displaying images (such as video) or a machine capable of processing and playing audio files, such as a voice mail system.

The present invention includes the ability to redirect certain message attachments to such an external machine 30 if the redirector program configuration data reflects that the mobile device 24 cannot receive and process the attachments, or if the user has specified that certain attachments are not to be forwarded to mobile device 24, even if such device can process those attachments. By way of example, consider an E-mail sent to a user that includes three attachments—a word processing document, a video clip and an audio clip. The redirection program 12 could be configured to send the text of the E-mail to the remote device 24, to send the word processing document to a networked printer located near the user, to send the video clip to a memory store accessible through a secure connection through the internet and to send the audio clip to the user's voice mail system. This example is not intended to limit the breadth and scope of the invention, but rather to illustrate the variety of possibilities embodied in the redirection concept.

Figure 4:
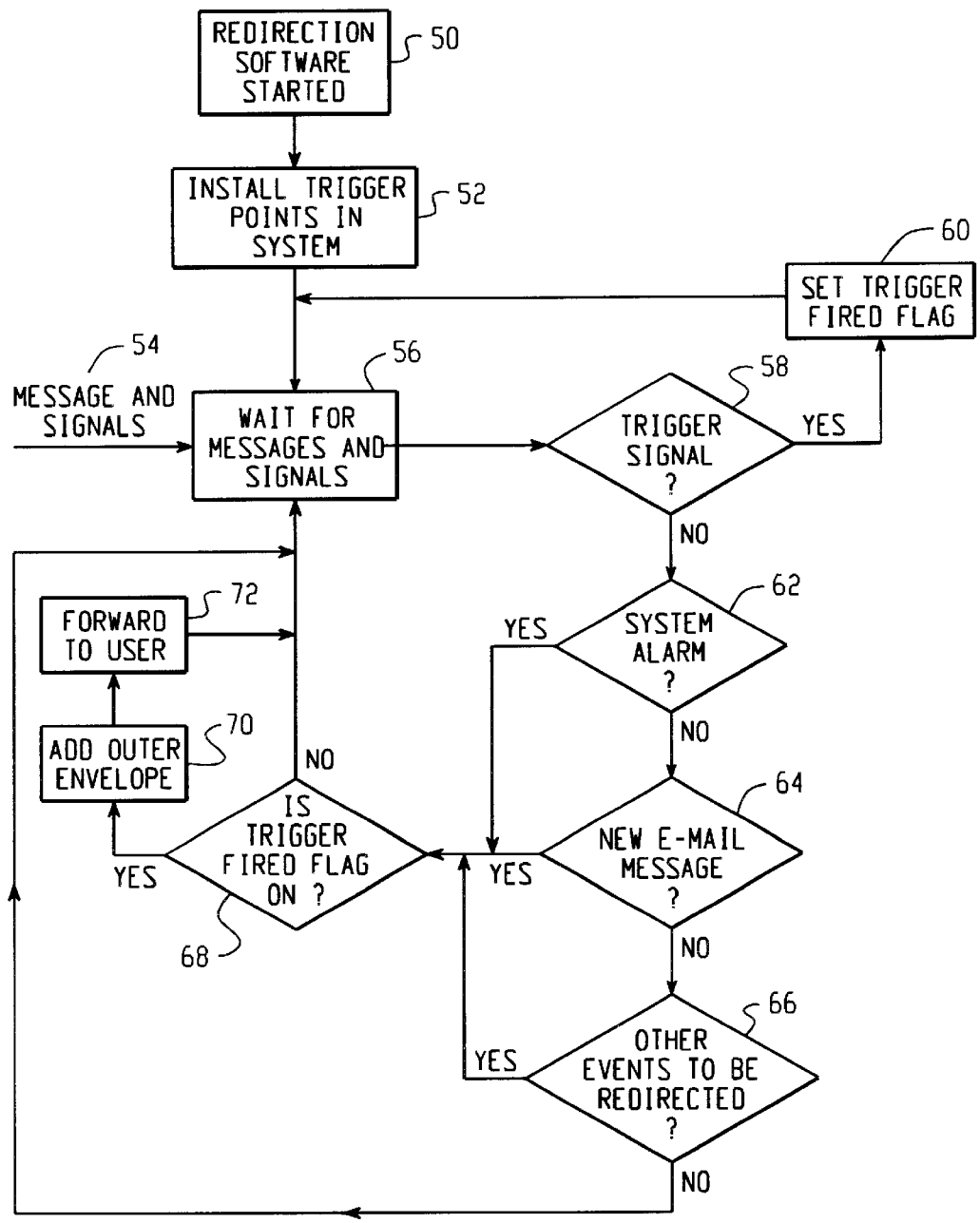
FIG. 4 is a flow chart showing the steps carried out by the redirector software operating at the host system.

The preferred mobile data communication device 24 is a hand-held two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via a network connection 22. Although it is preferable for the system to operate in a two-way communications mode, certain aspects of the invention could be beneficially used in a "one and one-half" or acknowledgment paging environment, or even with a one-way paging system. The mobile data communication device 24 includes software program instructions that work in conjunction with the redirector program 12 to enable the seamless, transparent redirection of user-selected data items. FIG. 4 describes the basic method steps of the redirector program 12, and FIG. 5 describes the steps of the corresponding program operating at the mobile device 24.

In an alternative embodiment of the present invention, not explicitly shown in the drawings, the mobile device 24 also includes a redirector program. In this embodiment, user selected data items can be replicated from the host to the mobile device and vice versa. The configuration and operation of the mobile device 24 having a redirector program is similar to that described herein with respect to FIGS. 1–4.

A user of the present invention can configure the redirector program 12 to push certain user-selected data items to the user's mobile data communication device 24 when the redirector 12 detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, etc. Alternatively, the user-selected data items could include any other type of message that is transmitted to the host system 10A, or that the host system 10A acquires through the use of intelligent agents, such as data that is received after the host system 10A initiates a search of a database, a Web site or a bulletin board. In some instances, only a portion of the data item is transmitted to the mobile device 24 in order to minimize the amount of data transmitted via the wireless network 22. In these instances, the mobile device 24 can optionally send a command message (C) to the host system 10A to retrieve more or all of the data item if the user desires to receive it.

The user-defined event triggers include external events, internal events and networked events. External events preferably include: (1) receiving a command message (such as message C) from the user's mobile data communication device to begin redirection, or to execute some other command at the host, such as a command to enable the "preferred list mode" (described below), or to add or subtract a particular sender from the preferred list of the preferred list mode; (2) receiving a similar message from some external computer; and (3) sensing that the user is no longer in the vicinity of the host system; although, alternatively, an external event can be any other detectable occurrence that is external to the host system 10.

Internal events may include a calendar alarm, screen saver activation, keyboard timeout, programmable timer, or any other user-defined event that is internal to the host system 10. Networked events are user-defined messages that are transmitted to the host system from another computer coupled to the host system 10A via a network to initiate redirection. These are just some of the event triggers that could be used with the present invention to initiate replication of the user-selected data items from the host system 10A to the mobile device 24. Other types of triggers are also within the scope of the present invention.

FIG. 1 shows an E-mail message A being communicated over LAN 14 from computer 26 to the user's desktop system 10A (also shown in FIG. 1 is an external message C, which could be an E-mail message from an Internet user, or could be a command message from the user's mobile device 24). Once the message A (or C) reaches the primary message store of the host system 10A, it can be detected and acted upon by the redirection software 12. The redirection software 12 can use many methods of detecting new messages. The preferred method of detecting new messages is using Microsoft's ® Messaging API ("MAPI"), in which programs, such as the redirector program 12, register for notifications or 'advise syncs' when changes to a mailbox take place. Other methods of detecting new messages could also be used.

Assuming that the redirector program 12 is activated, and has been configured by the user (either through the sensing of an internal, external, or networked event) to replicate certain user data items (including messages of type A or C) to the mobile device 24, when the message A is received at the host system 10A, the redirector program 12 detects its presence and prepares the message for redirection to the mobile device 24. In preparing the message for redirection, the redirector program 12 may compress the original message A, it may just compress the message header, or it may encrypt the entire message A to create a secure link to the mobile device 24.

The address of the user's mobile data communication device 24, the type of device, and whether the device 24 can accept certain types of attachments, such as word processing or voice attachments, are also programmed into the redirector 12. If the user's type of mobile device cannot accept a particular type of attachments, then the redirector 12 can be programmed to route those attachments to a fax or voice number where the user is located using an attached fax or voice machine 30.

The redirector 12 may also be programmed with a "preferred list mode" operation that is configured by the user either at the host system 10A, or remotely from the user's mobile data communication device 24 by transmitting a command message C. The "preferred list" in the "preferred list mode" contains a list of senders (other users) whose messages are to be redirected, or it may contain a list of message characteristics that determine whether a message is to be redirected, or it may contain both a list of senders and a list of message characteristics. For example, a message characteristic may relate to the size of the message, or the type of message, or whether the message has any attachments, or whether the message is originating from a particular domain. If activated, the preferred list mode causes the redirector program 12 to operate like a filter, only redirecting certain user data items based on whether the data item was sent from a sender on the preferred list or has certain message characteristics that if present will trigger or suppress redirection of the message.

In the example of FIG. 1, if desktop system 26 was operated by a user on the preferred list of host system 10A, and the preferred list option was activated, then message A would be redirected. If, however, desktop 26 was operated by a user not on the host system's preferred list, then message A would not be redirected, even if the user of the host system had configured the redirector to push messages of type A. The user of the host system 10A can configure the preferred list directly from the desktop system 10A, or, alternatively, the user can send a command message (such as C) from the mobile device 24 to the desktop system 10A to activate the preferred list mode, or to add or delete certain senders or message characteristics from the previously configured preferred list. In this manner, the user can remotely control the operation of the preferred list mode filter so as to dynamically alter the filtering characteristics of the redirector program 12.

After the redirector 12 has determined that a particular message should be redirected, and it has prepared that message for redirection, the software 12 then sends the message A to a secondary memory store located in the mobile device 24. In doing so, the redirector preferably repackages message A as an E-mail with an outer envelope B that contains the addressing information of the mobile device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile device 24, the outer envelope B is removed, and the original message A is placed in the secondary memory store within the mobile device 24. By repackaging and removing the outer envelope in this manner, the present invention causes the mobile computer 24 to appear to be at the same physical location as the host system 10, thus creating a transparent system.

In the case where message C is representative of an external message from a computer on the Internet 18 to the host system 10A, and the host 10A has been configured to redirect messages of type C, then in a similar manner to message A, message C would be repackaged with an outer envelope B and transmitted to the user's mobile device 24. In the case where message C is representative of a command message from the user's mobile device 24 to the host system 10A, the command message C is not redirected, but is acted upon by the host system 10A.

If the redirected user data item is an E-mail message, as described above, the user at the mobile device 24 sees the original subject, sender's address, destination address, carbon copy and blind carbon copy information. When the user replies to this message, or when the user authors a new message, the software operating at the mobile device 24 adds a similar outer envelope to the reply message (or the new message) to cause the message to be routed first to the user's host system 10A, which then removes the outer envelope and redirects the message to the final destination, such as back to computer 26. In the preferred embodiment, this results in the outgoing redirected message from the user's host system 10A being sent using the E-mail address of the host mailbox, rather than the address of the mobile device, so that it appears to the recipient of the message that the message originated from the user's desktop system 10A rather than the mobile data communication device 24. Any replies to the redirected message will then be sent to the desktop system 10A, which if it is still in redirector mode, will repackage the reply and re-send it to the user's mobile data device 24, as described above.

Figure 2:
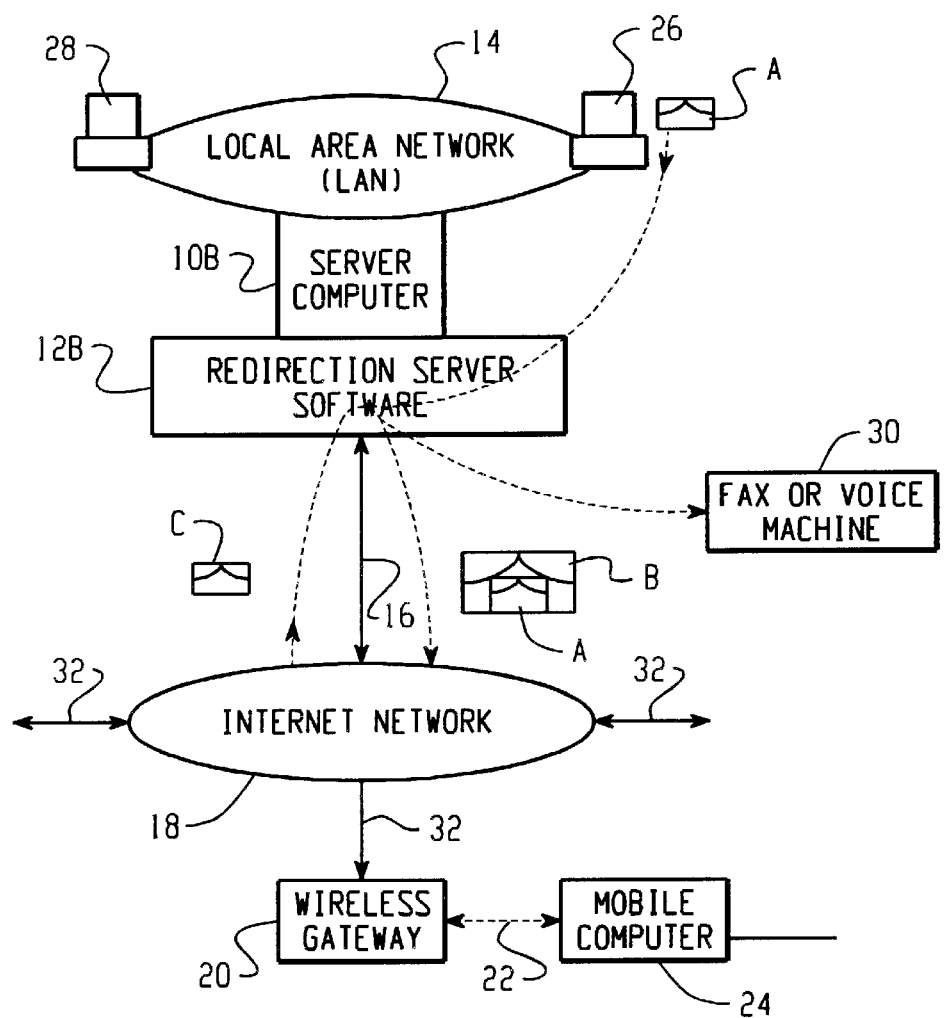
FIG. 2 is a system diagram showing the redirection of user data items from a network server (host system) to the user's mobile data communication device, where the redirector software is operating at the server.

FIG. 2 is an alternative system diagram showing the redirection of user data items from a network server host system 10B to the user's mobile data communication device 24, where the redirector software 12 is operating at the server 10B. This configuration is particularly advantageous for use with message servers such as Microsoft'® Exchange Server, which is normally operated so that all user messages are kept in one central location (or mailbox store) on the server instead of in a memory store within each user's desktop PC. This configuration has the additional advantage of allowing a single system administrator to configure and keep track of all users having messages redirected. If the system includes encryption keys, these too can be kept at one place for management and update purposes.

In this alternative configuration, server 10B preferably maintains a user profile for each user's desktop system 26, 28, including information such as whether a particular user can have data items redirected, which types of message and information to redirect, what events will trigger redirection, the address of the users' mobile data communication device 24, the type of mobile device, and the user's preferred list, if any. The event triggers are preferably detected at the user's desktop system 26, 28 and can be any of the internal, external or networked events listed above. The desktop systems 26, 28 preferably detect these events and then transmit a message to the server host computer 10B via LAN 14 to initiate redirection. Although the user data items are preferably stored at the server host computer 10B in this embodiment, they could, alternatively, be stored at each user's desktop system 26, 28, which would then transmit them to the server computer 10B after an event has triggered redirection.

As shown in FIG. 2, desktop system 26 generates a message A that is transmitted to and stored at the host system 10B, which is the network server operating the redirector program 12. The message A is for desktop system 28, but in this embodiment, user messages are stored at the network server 10B. When an event occurs at desktop system 28, an event trigger is generated and transmitted to the network server 10B, which then determines who the trigger is from, whether that desktop 28 has redirection capabilities, and if so, the server 10B (operating the redirector program 12) uses the stored configuration information to redirect message A to the mobile computer 24 associated with the user of desktop system 28.

As described above with reference to FIG. 1, message C could be either a command message from a user's mobile data communication device 24, or it could be a message from an external computer, such as a computer connected to the Internet 18. If the message C is from an Internet computer to the user's desktop system 28, and the user has redirection capabilities, then the server 10B detects the message C, repackages it using electronic envelope B, and redirects the repackaged message (C in B) to the user's mobile device 24. If the message C is a command message from the user's mobile device 24, then the server host computer 10B simply acts upon the command message using the redirector program 12.

Figure 3:
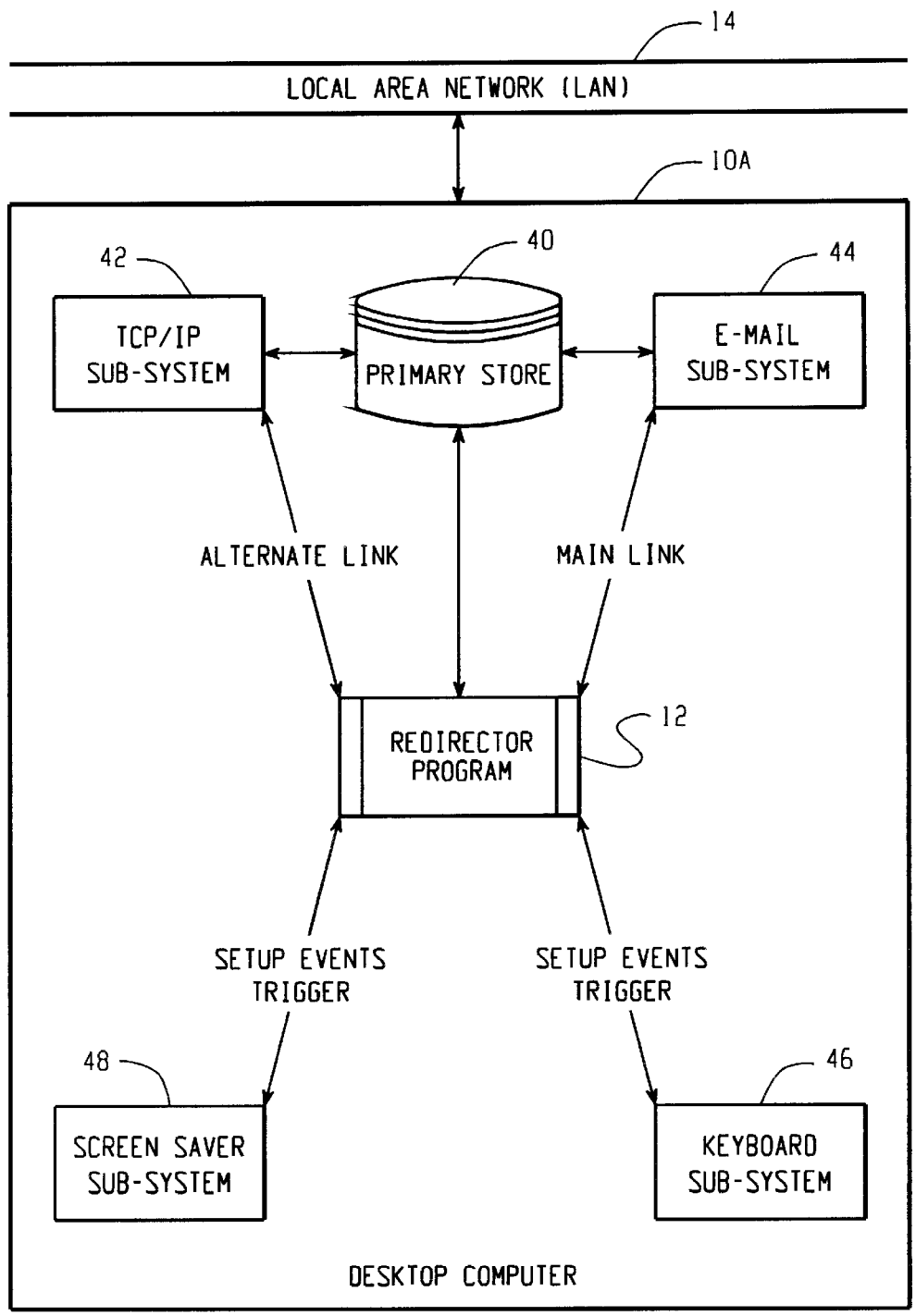
FIG. 3 is a block diagram showing the interaction of the redirector software with other components of the host system in FIG. 1 (the user's desktop PC) to enable the pushing of information from the host system to the user's mobile data communication device.

Turning now to FIG. 3, a block diagram is set forth that demonstrates the interaction of the redirector software 12 with additional components of the desktop host system 10A shown in FIG. 1 (i.e., the desktop PC) to enable more fully the pushing of information from the host system 10A to the user's mobile data communication device 24. These additional components are illustrative of the type of event-generating systems that can be configured and used with the redirector software 12, and of the type of repackaging systems that can be used to interface with the mobile communication device 24 to make it appear transparent to the user.

The desktop host system 10A is connected to LAN 14, and can send and receive data, messages, signals, event triggers, etc., to and from other systems connected to the LAN 14. Through the LAN, the system 10A can also communicate with external networks 18, 22, such as the Internet or a wireless data network. In addition to the standard hardware, operating system, and application programs associated with a typical microcomputer or workstation, the desktop system 10A includes the redirector program 12, a TCP/IP sub-system 42, an E-mail sub-system 44, a primary data storage device 40, a screen saver sub-system 48, and a keyboard sub-system 46. The TCP/IP and E-mail subsystems 42, 44 are examples of repackaging systems that can be used to achieve the transparency of the present invention, and the screen saver and keyboard sub-systems 46, 48 are examples of event generating systems that can be configured to generate event messages or signals that trigger redirection of the user selected data items.

The method steps carried out by the redirector program 12 are described in more detail in FIG. 4. The basic functions of this program are: (1) to configure and setup the user-defined event trigger points that will start redirection; (2) to configure the types of user data items for redirection and optionally configure a preferred list of senders whose messages are to be redirected; (3) to configure the type and capabilities of the user's mobile data communication device; (4) to receive messages and signals from the repackaging systems and the event generating systems; and (5) to command and control the redirection of the user-selected data items to the mobile data communication 24 device via the repackaging systems. Other functions not specifically enumerated could also be integrated into this program.

The E-Mail sub-system 44 is the preferred link to repackaging the user-selected data items for transmission to the mobile data communication device 24, and preferably uses industry standard mail protocols, such as SMTP, POP, IMAP, MIME and RFC-822, to name but a few. The E-Mail sub-system 44 can receive messages A from external computers on the LAN 14, or can receive messages C from some external network such as the Internet 18 or a wireless data communication network 22, and stores these messages in the primary data store 40. Assuming that the redirector 12 has been triggered to redirect messages of this type, the redirector detects the presence of any new messages and instructs the E-Mail system 44 to repackage the message by placing an outer wrapper B about the original message A (or C), and by providing the addressing information of the mobile data communication device 24 on the outer wrapper B. As noted above, this outer wrapper B is removed by the mobile device 24, and the original message A (or C) is then recovered, thus making the mobile device 24 appear to be the desktop system 10A.

In addition, the E-Mail sub-system 44 receives messages back from the mobile device 24 having an outer wrapper with the addressing information of the desktop system 10A, and strips this information away so that the message can be routed to the proper sender of the original message A (or C). The E-Mail sub-system also receives command messages C from the mobile device 24 that are directed to the desktop system 10A to trigger redirection or to carry out some other function. The functionality of the E-Mail sub-system 44 is controlled by the redirector program 12.

The TCP/IP sub-system 42 is an alternative repackaging system. It includes all of the functionality of the E-Mail sub-system 44, but instead of repackaging the user-selected data items as standard E-mail messages, this system 42 repackages the data items using special-purpose TCP/IP packaging techniques. This type of special-purpose sub-system is useful in situations where security and improved speed are important to the user. The provision of a special-purpose wrapper that can only be removed by special software on the mobile device 24 provides added security, and by bypassing E-mail store and forward systems, the speed of delivery of messages can be improved.

As described previously, the present invention can be triggered to begin redirection upon detecting numerous external, internal and networked events, or trigger points. Examples of external events include: receiving a command message from the user's mobile data communication device 24 to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer that is connected to the host system via a network to initiate redirection.

The screen saver and keyboard sub-systems 46, 48 are examples of systems that are capable of generating internal events. Functionally, the redirector program 12 provides the user with the ability to configure the screen saver and keyboard systems so that under certain conditions an event trigger will be generated that can be detected by the redirector 12 to start the redirection process. For example, the screen saver system can be configured so that when the screen saver is activated after, for example, 10 minutes of inactivity on the desktop system, an event trigger is transmitted to the redirector 12, which starts redirecting the previously selected user data items. In a similar manner, the keyboard sub-system can be configured to generate event triggers when no key has been depressed for a particular period of time, thus indicating that redirection should commence. These are just two examples of the numerous application programs and hardware systems internal to the host system 10A that can be used to generate internal event triggers.

Figure 5:
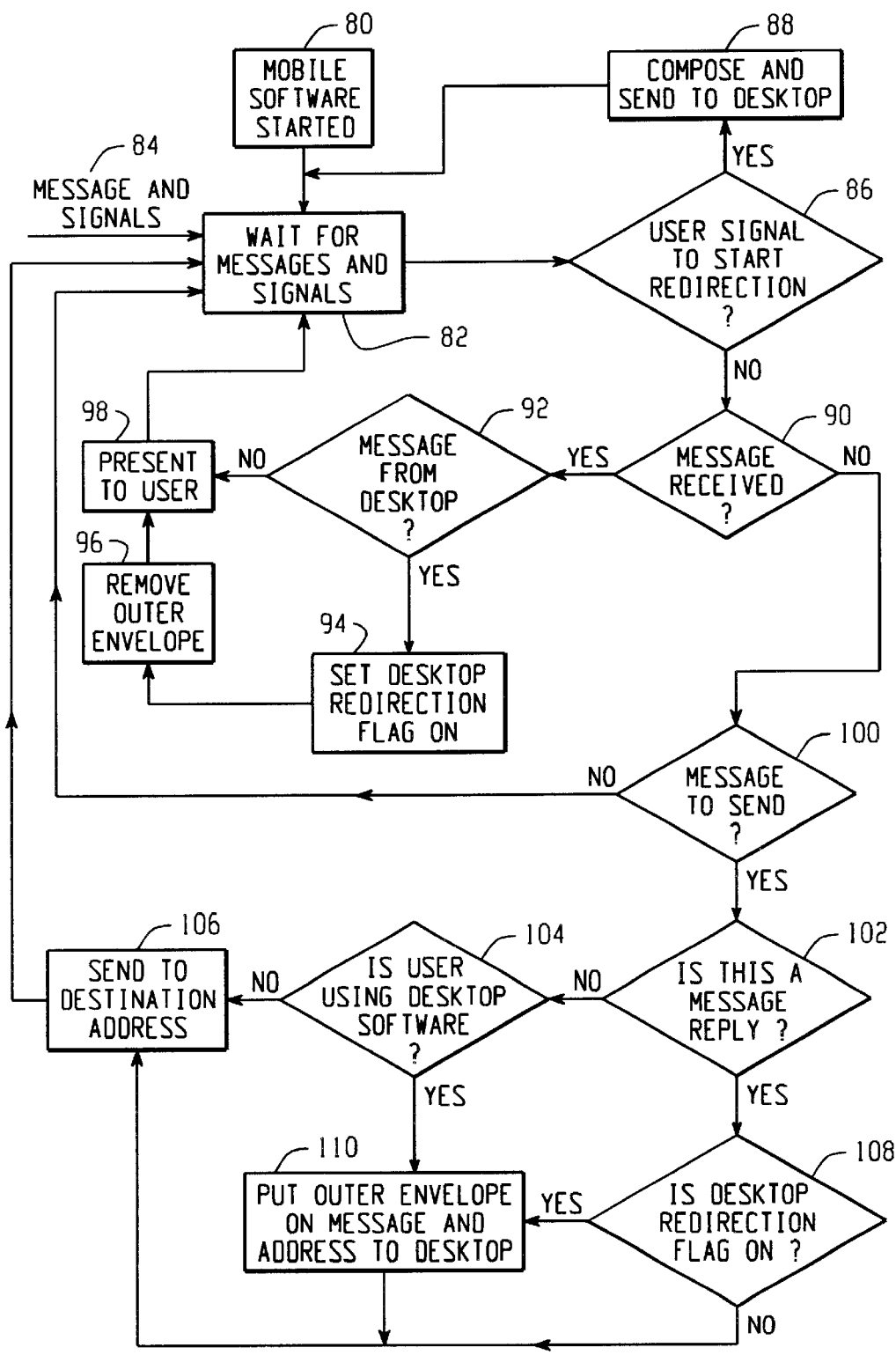
FIG. 5 is a flow chart showing the steps carried out by the mobile data communication device to interface with the redirector software operating at the host system.

FIGS. 4 and 5, set forth, respectively, flow charts showing the steps carried out by the redirector software 12 operating at the desktop host system 10A, and the steps carried out by the mobile data communication device 24 in order to interface with the host system. Turning first to FIG. 4, at step 50, the redirector program 12 is started and initially configured. The initial configuration of the redirector 12 includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing, and inputting the address of the mobile device 24; and (5) configuring the preferred list of user selected senders whose messages are to be redirected.

FIG. 4 sets forth the basic steps of the redirector program 12 assuming it is operating at a desktop host system 10A, such as shown in FIG. 1. If the redirector 12 is operating at a network server host system 10B, as shown in FIG. 2, then additional configuration steps may be necessary to enable redirection for a particular desktop system 26, 28 connected to the server 10B, including: (1) setting up a profile for the desktop system 26, 28 indicating its address, events that will trigger redirection, and the data items that are to be redirected upon detecting an event; (2) maintaining a storage area at the server 10B for the data items; and (3) storing the type of data communication device 24 to which the desktop system's data items are to be redirected, whether and what type of attachments the device 24 is capable of receiving and processing, and the address of the mobile device 24.

Once the redirector program is configured 50, the trigger points (or event triggers) are enabled at step 52. The program 12 then waits 56 for messages and signals 54 to begin the redirection process. A message could be an E-Mail message or some other user data item that may have been selected for redirection, and a signal could be a trigger signal, or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages) that have been selected for redirection should be pushed to the user's mobile data communication device 24.

If the message or signal 54 is not a trigger event, the program then determines at steps 62, 68 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12 determines, at step 68, whether the trigger flag has been set, indicating that the user wants these items redirected to the mobile device 24. If the trigger flag is set, then at step 70, the redirector 12 causes the repackaging system (E-Mail or TCP/IP) to add the outer envelope to the user data item, and at step 72 the repackaged data item is then redirected to the user's mobile data communication device 24 via LAN 14, WAN 18, wireless gateway 20 and wireless network 22. Control then returns to step 56 where the program waits for additional messages and signals to act upon.

Although not shown explicitly in FIG. 4, after step 68 the program could, if operating in the preferred list mode, determine whether the sender of a particular data item is on the preferred list, and if not, then the program would skip over steps 70 and 72 and proceed directly back to step 56. If the sender is on the preferred list, then control returns to steps 70 and 72 for repackaging and transmission of the message from the preferred list sender to the mobile device 24.

FIG. 5 sets forth the method steps carried out by the user's mobile data communication device 24 in order to interface to the redirector program 12 of the present invention. At step 80, the mobile software is started and the mobile device 24 is configured to operate with the system of the present invention, including, for example, storing the address of the user's desktop system 10A.

At step 82, the mobile device waits for messages and signals 84 to be generated or received. Assuming that the redirector software 12 operating at the user's desktop system 10A is configured to redirect upon receiving a message from the user's mobile device 24, then at step 86 the user can decide to generate a command message that will start redirection at the host system 10A. If the user does so, then at step 88 the redirection message is composed and sent to the desktop system 10A via the wireless network 22, through the wireless gateway 20, via the Internet 18 to the LAN 14, and is finally routed to the desktop machine 10A.

In this situation where the mobile device 24 is sending a message directly to the desktop system 10A, no outer wrapper is added to the message (such as message C in FIGS. 1 and 2). In addition to the redirection signal, the mobile device 24 could transmit any number of other commands to control the operation of the host system 10A, and in particular the redirector program 12. For example, the mobile 24 could transmit a command to put the host system 10A into the preferred list mode state, and then could transmit additional commands to add or subtract certain senders or certain message characteristics from the preferred list. In this manner, the mobile device 24 can dynamically limit the amount of information being redirected to it by altering the preferred list.

Other example commands include: (1) a message to change the configuration of the host system 10A to enable the mobile device 24 to receive and process certain attachments; and (2) a message to instruct the host system 10A to redirect an entire data item to the mobile device 24 in the situation where only a portion of a particular data item has been previously redirected.

Turning back to FIG. 5, if the user signal or message is not a direct message to the desktop system 10A to begin redirection (or some other command), then control is passed to step 90, which determines if a message has been received. If a message is received by the mobile, and it is a message from the user's desktop 10A, as determined at step 92, then at step 94 a desktop redirection flag is set "on" for this message, and control passes to step 96 where the outer envelope is removed. Following step 96, or in the situation where the message is not from the user's desktop 10A, as determined at step 92, control passes to step 98, which displays the message for the user on the mobile device's display. The mobile unit 24 then returns to step 82 and waits for additional messages or signals.

If the mobile device 24 determines that a message has not been received at step 90, then control passes to step 100, where the mobile 24 determines whether there is a message to send. If not, then the mobile unit returns to step 82 and waits for additional messages or signals. If there is at least one message to send, then at step 102 the mobile 24 determines whether it is a reply message to a message that was received by the mobile unit. If the message to send is a reply message, then at step 108, the mobile 24 determines whether the desktop redirection flag is on for this message. If the redirection flag is not on, then at step 106 the reply message is simply transmitted from the mobile device 24 to the destination address via the wireless network 22. If, however, the redirection flag is on, then at step 110 the reply message is repackaged with the He outer envelope having the addressing information of the user's desktop system 10A, and the repackaged message is then transmitted to the desktop system 10A at step 106. As described above, the redirector program 12 executing at the desktop system then strips the outer envelope and routes the reply message to the appropriate destination address using the address of the desktop system 10A as the "from" field, so that to the recipient of the redirected message, it appears as though it originated from the user's desktop system rather than the mobile data communication device.

If, at step 102, the mobile 24 determines that the message is not a reply message, but an original message, then control passes to step 104, where the mobile 24 determines if the user is using the redirector software 12 at the desktop system 10A, by checking the mobile unit's configuration. If the user is not using the redirector software 12, then the message is simply transmitted to the destination address at step 106. If, however, the mobile determines that the user is using the redirector software 12 at the desktop system 10A, then control passes to step 110, where the outer envelope is added to the message. The repackaged original message is then transmitted to the desktop system 10A at step 106, which, as described previously, strips the outer envelope and routes the message to the correct destination. Following transmission of the message at step 106, control of the mobile 24 returns to step 82 and waits for additional messages or signals.

Now with reference to FIGS. 6–8, there will be described an alternative two-host Internet-based system using many of the features of the system described in the network-based host system 10B configuration shown in FIG. 2. In the system shown in FIGS. 6-8, however, instead of a single host system 10B for storing the user's messages and for operating the redirector program 12, there are two hosts, a messaging host 230, where the user's data items are stored, and a wireless redirector host system 240, where a wireless redirector program 242 operates. These two host system are preferably coupled together via the Internet 218. The wireless redirector program 242 is similar in many respects to the redirector program 12 described above, but is configured for communicating with a wireless gateway 260 coupled to a wireless data network 222.

Figure 6:
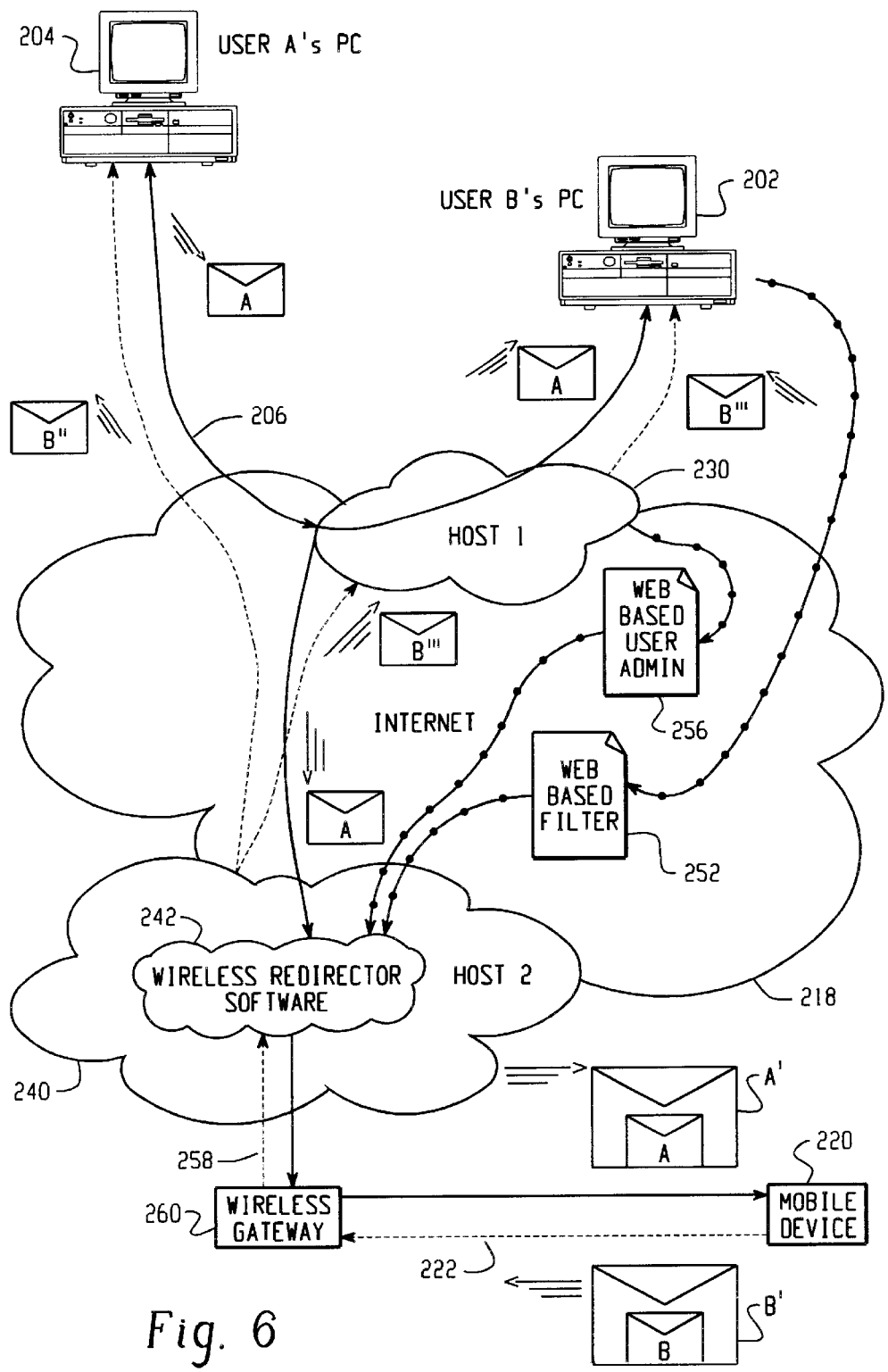
FIG. 6 is a system diagram showing the redirection of user data items from a user's host system to the user's mobile data communication device, where the redirector software is operating at the wireless redirector host system.

With reference to FIG. 6, there is shown an example system diagram showing the redirection of user data items, such as message A, from user A's desktop PC 204 to user B's mobile data communication device 220, or alternatively, message B from user B's mobile communication device 220 to user A. In this example, the messaging host system 230 maintains and stores data items received from the Internet 218 for user B in a message inbox. In this particular system example, the messaging host system 230 is preferably an Internet Service Provider ("ISP") that provides connectivity to the Internet 218 for a plurality of users, including user B. In another embodiment of the present invention, the messaging host 230 may be a web-based E-mail hosting service such as MSN Hotmail™ or a variety of other known web-based E-mail hosting systems. In another embodiment of the invention, the E-mail hosting service supplies a strictly wireless solution.

In this embodiment of the invention, the messaging host system 230 is configured so as to forward a copy of all incoming data items destined for user B's inbox to a second host referred to herein as a wireless redirector host system 240. The wireless redirector host system 240 includes the wireless redirector program 242. Advantageously, data items destined for a user of the messaging host system 230 having a mobile communication device are continuously "pushed" to the wireless redirector host system 240 as they arrive at the messaging host system 230. Upon arrival at the redirector host system 240, a wireless redirector software program 242 operating at the system 240 determines whether such data items are user-selected data items to be pushed via a wireless network 222 to the user's mobile communications device 220. In this manner, user-selected data items are advantageously pushed out to the mobile communication device 220 contemporaneously as they arrive to the messaging host system 230 so that the user need not be concerned about delays in receiving user-selected data items on the user's mobile communication device 220.

The wireless redirector host system 240 acts primarily as a gateway for data items received from the Internet 218 and those specific data items that have been user pre-selected to be redirected (via filtering rules to be described later) to the user's mobile communications device via the wireless network 222. These filtering rules are similar to the "preferred list mode" operation described above with respect to the systems shown in FIGS. 1 and 2.

Message A in FIG. 6 represents a data item, such as an E-mail message, sent from user A's desktop PC 204 having user B as the recipient. Because user B has a mailbox on the messaging host system 230, the message A will be directed via the Internet to the host system 230. The flow of this message A is shown in a single solid line 206.

Message B in FIG. 6 represents an external message created on and sent from user B's mobile data communications device 220 having user A as a recipient. Alternatively, message B also may represent a command message from user B's mobile data communication device 220 to the wireless redirector host system 240. The flow of this message B is shown in a single dashed line 258.

Figure 7:
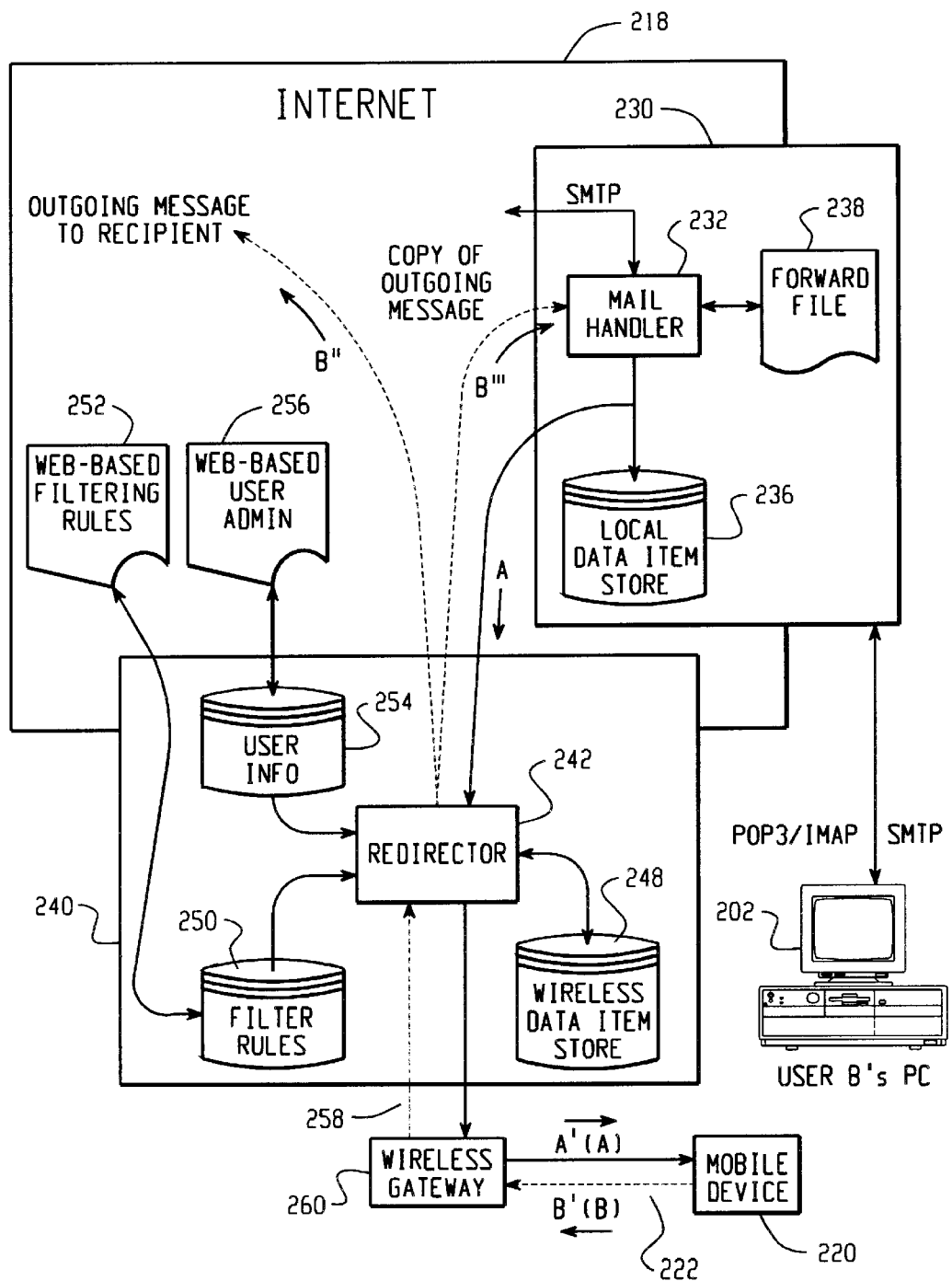
FIG. 7 is a block diagram showing the interaction of the redirector software with other components of the host system in FIG. 6 to enable the pushing of information from the host system to the user's mobile data communications device.

As described in more detail in FIG. 7, the wireless redirector host system 240 preferably includes, along with the typical hardware and software associated with an Internet gateway, the wireless redirector software 242 which includes a mail handler, preferably a sendmail daemon (not shown), a local delivery agent (not shown), a plurality of wireless mail stores 248 (preferably one for each mobile user such as user B), a filter database 250, and a mobile user profile database 254.

Also as described in more detail in FIG. 7, the messaging host system 230 is preferably a Unix system that includes a sendmail daemon 232, a ".forward" file 238, and a memory storage area 236 for storing the data items of certain user's that are having messages redirected to their mobile data communication devices 220.

Referring now to FIGS. 6 and 7, the two-host system invention will first be described by way of example with reference to message A. FIG. 6 shows an E-mail message A being communicated over the Internet 218 from user A's desktop PC 204 destined for user B's inbox, which is located on the messaging host system 230. Once the message A reaches a mail handler 252 at the messaging host 230, such as a sendmail daemon 232 in the preferred embodiment, it can be detected and acted upon by this system 230.

One of the objectives of the present invention is to be as non-obtrusive as possible to the messaging host system 230 so as to make the invention simple to install and implement for ISPs. The messaging host system 230 may be configured in many ways to detect such messages. Since not all users of the ISP will have a mobile communication device 220, it is preferable that the system 230 includes a unique user file that is accessed and modified upon the arrival of any new message. The preferred method of detecting new messages, such as message A, is using Unix's ".forward" file 238. Preferably, the redirection (or forwarding) of data items is accomplished by modifying the ".forward" file 238 typically found in the user's root directory at the messaging host system 230, such as an ISP. The ".forward" file is a simple ASCII text file comprising at least a list of one or more E-mail addresses (with some control information). The sendmail daemon 232 checks for the existence of this file 238, and uses its content to forward data items to the appropriate locations. Other methods of detecting and forwarding new data items destined for a user having a mobile communications device 220 could also be used and such other methods are well within the scope of the present invention.

An example of the content of the ".forward" file modified for the present invention is:

\bgilhuly@isp.net bgilhuly@wirelessredirectorhost.net

In this example, the sendmail daemon 232 would redirect a copy of any incoming data items to those two addresses, namely "bgilhuly@isp.net" and "bgilhuly@wirelessredirectorhost.net." In the latter case, the data item would, preferably, be sent via the Internet to the wireless redirector host system 240 for further handling by the wireless redirector software program 242. The former address requires the sendmail daemon 232 to send the data item to user B's inbox of the local data item store 236. User B may access his data items in the inbox as he traditionally does —by, for example, POP3 or IMAP. In this manner, the forwarding activity is transparent to the user. The user B when viewing the inbox data items at his desktop PC 202 would know of the redirecting activity only by the message text that may be added to the messages as they are redirected by the mail handler.

Assuming that the redirector program 242 is activated at the wireless redirector host system 240, and has been configured by the user to replicate certain user data items (such as message A) to the mobile communications device 220, when the message A is received at the wireless redirector host system 240, the redirector program 242 detects message A's presence and prepares the message for a second redirection to the mobile device 220. In preparing the message for the second redirection, the redirector program 242 may compress the original message A, it may compress the message header, or it may encrypt the entire message A to create a secure link to the mobile device 220. However, before the redirector program 242 compresses or encrypts the message A and redirects it to the mobile device 220, it examines stored user information and filtering rules that are associated with the recipient, user B, so as to determine how the message A should be handled.

A) Filtering

Preferably, before the redirector program 242 begins preparing the message A for redirection, the redirector 242 examines the data item with respect to rules contained on a user B configurable filtering agent 250 (see, FIG. 7) which essentially is a database of rules that are to be applied for each user's incoming data items. The filtering agent 250 is preferably accessible by the user via the World Wide Web in a filter web page 252. The filter web page 252 allows the user, if the user so desires, to access and apply a plurality of filtering rules or any combination thereof that are to be applied to all incoming data items destined for that user. Preferably, in addition to filtering rules, web page 252 allows user B to switch between an active or inactive state for the redirection of user B's incoming messages. This switching feature is particularly useful during instances where user B is at his desktop PC 202 and accessing his inbox of the local store 236 and desires that the redirection of incoming mail to his mobile device 220 to be temporarily deactivated. The following criteria are exemplary of the types of filtering rules that may be available to the user: sender(s); how addressed (To, CC, BCC); subject keyword(s); message keyword(s); and importance (high, low, normal).

In any event, the filtering agent 250 is preferably hosted by the wireless redirector host system 240, but may be hosted by alternative host systems, including the messaging host system 230 so long as the redirector program 242 has access to the most current set of rules and can make a determination whether any particular data item has satisfied all user-defined filtering rules. Alternatively implemented, the filtering agent 250 may be combined with the user profile database 254. Data items that do not clear the filtering rules are marked as "handled" by the redirector program 242 in the wireless data item store 248, and are not further handled by the redirector 242.

B) User Profile

Also accessible by the redirector program 242 is the address of the user's mobile data communication device 220, the user's SMTP address, the type of device 220, and whether the device 220 can accept certain types of attachments, such as word processing or voice attachments. This information is preferably maintained in a user profile database 254 (see, FIG. 7). Such user information may be preferably created, updated and removed via a web-based user administration page 256. Web page 256 is preferably access-restricted to the system administrator of the messaging host system 230 who may from time to time add new users to the wireless redirection service. In addition to the above user information, the system administrator preferably has a switch control feature on the web page 256 to deactivate or activate redirection of the data items from the host system 230 that takes precedence over the user's selection on web page 252. This, advantageously, allows the system administer to maintain control over the value-added service described herein.

If the user's type of mobile device 220 cannot accept certain types of attachments, then the redirector program 242 can be programmed to route the attachments to a fax or voice number where the user is located. The user may provide such information details to the redirector program 242 via a return message created at the mobile device 220.

Advantageously, the web pages 252, 256 for configuring the filtering and user administration information used by the system preferably require that each user or host administrator login with a password before accessing the pages 252, 256. In addition, the web pages 252, 256 are preferably designed with an interface look-and-feel that is similar to the user's ISP or web-based E-mail host system. In this manner, the messaging host system 230 can be seen to be delivering a wireless E-mail solution with its traditional services.

C) Redirection

After the redirector program 242 has determined that a particular message should be redirected, and it has prepared the message for redirection, the software 242 preferably converts the message from MIME to CMIME (MIME is a standard Internet mail format, and CMIME is a compressed version of MIME), and then sends the message A to a memory store located in the mobile communications device 220 via the wireless gateway 250 and the wireless data network 222. In doing so, the redirector program 242 preferably packages message A as a message with an outer envelope A' that contains the addressing information of the mobile device 220. In the preferred embodiment, the outer envelope is GME. The wireless gateway 260 requires this outer envelope information A' in order to know where to send the redirected message A. Once the repackaged message (message A in A') is received by the mobile device 220, the outer envelope A' is removed, and the original message A is placed in the second memory store within the mobile device 220. By removing the outer envelope A' and presenting to the user of mobile device 220 message A, the present invention causes the mobile device 220 to appear to be at the same physical location as the messaging host system 230, or PC 202 in a transparent, seamlessly integrated Internet account hosted by messaging host system 230.

D) Outgoing Data Item From Mobile

If the redirected user data item is an E-mail message, as described above, then the user at the mobile device 220 sees the original subject line, sender's address, destination address, and carbon copy address. Preferably and desirably, the redirection of the E-mail message A is transparent to the mobile communication device user. When the user, at the mobile device 220, replies to message A, or when the user authors a new message (a reply or a new message collectively referred to as "message B"), the software operating at the mobile device 220 adds a similar outer envelope (message B') to the reply message B (or the new message B) to cause message B to be routed to the wireless redirector host system 240 via the wireless network 222, which then removes the outer envelope B', repackages message B as message B", and redirects message B" to the final destination, such as user A's PC desktop 204.

The general flow of such transmission is shown as a dotted line in FIG. 6. In this embodiment of the invention, the removal of the outer envelope B' and repackaging of message B as envelope B" results in the outgoing redirected message B" from the wireless redirector host system 240 being sent using the E-mail address of the user's mailbox on messaging host system 230, rather than the address of the mobile device 220, so that it appears to the recipient of the message B" that the message originated from the user's desktop system 202 or from the messaging host system 230 itself (as would be the case of a web-based E-mail hosting system) rather than the mobile data communication device 220. This transparency functionality is accomplished by the redirector 242 modifying the "from" and "reply to" identifiers associated with the message B to now have the SMTP address of user B's messaging host system 230 E-mail account. Advantageously, any replies to the message B" will then be sent to user B's inbox on messaging host system 230, which, if it is still in redirector mode, will repackage the reply and resend it to user B's mobile data device 220, as described above.

In this embodiment, a copy of message B (labelled B''') is redirected to user B's inbox at messaging host system 230 for retrieval and access by user B at some later time—for recording keeping purposes. In doing so, the redirector program 242 preferably repackages message B as message B''' so as to now have modified addressing information. In this preferred instance, the modified addressing information would include changing the "from" header information to read something to the following effect: "Sent from mobile communications device to recipient" where 'recipient' would be the recipient's address of message B".This message B''' is forwarded, preferably via the Internet 218, to the messaging host system 230.

As shown in FIG. 7, the messaging host system is preferably configured as an ISP. Here, the ISP system 230 includes a mail handler, such as a sendmail daemon 232, which forwards the copy B''' to the local data item store 236 by a local delivery agent (not shown). Further, user B may preferably configure his local inbox of data items at the desktop 202 to store such copy messages in a specific inbox for mobile data communications device data items. Of course in this illustrative example, messaging host system 230 is configured to redirect all incoming data items to wireless redirector host system 240; therefore, sendmail 232 would detect a new message and the ".forward" file 238 would again be accessed and the forwarding information therein acted upon. Consequently, message B''' is redirected (not shown) to redirector host system 240. At the redirector host system 240, the redirector is preferably programmed to detect that such a message B''' is only a redirection of message B''' sent therefrom. As such, the redirector ignores this re-redirected message by preferably marking such messages as handled. Alternatively, the mail handler 232 at the messaging host system 230 is configured to detect such messages and to not redirect such messages.

It is to be understood that a plurality of messaging host systems 230 may use a single redirector host system 240 for redirection of users' E-mail messages. Further still, a single redirector program 242 may be used to service the plurality of messaging host systems 230.

Figure 8:
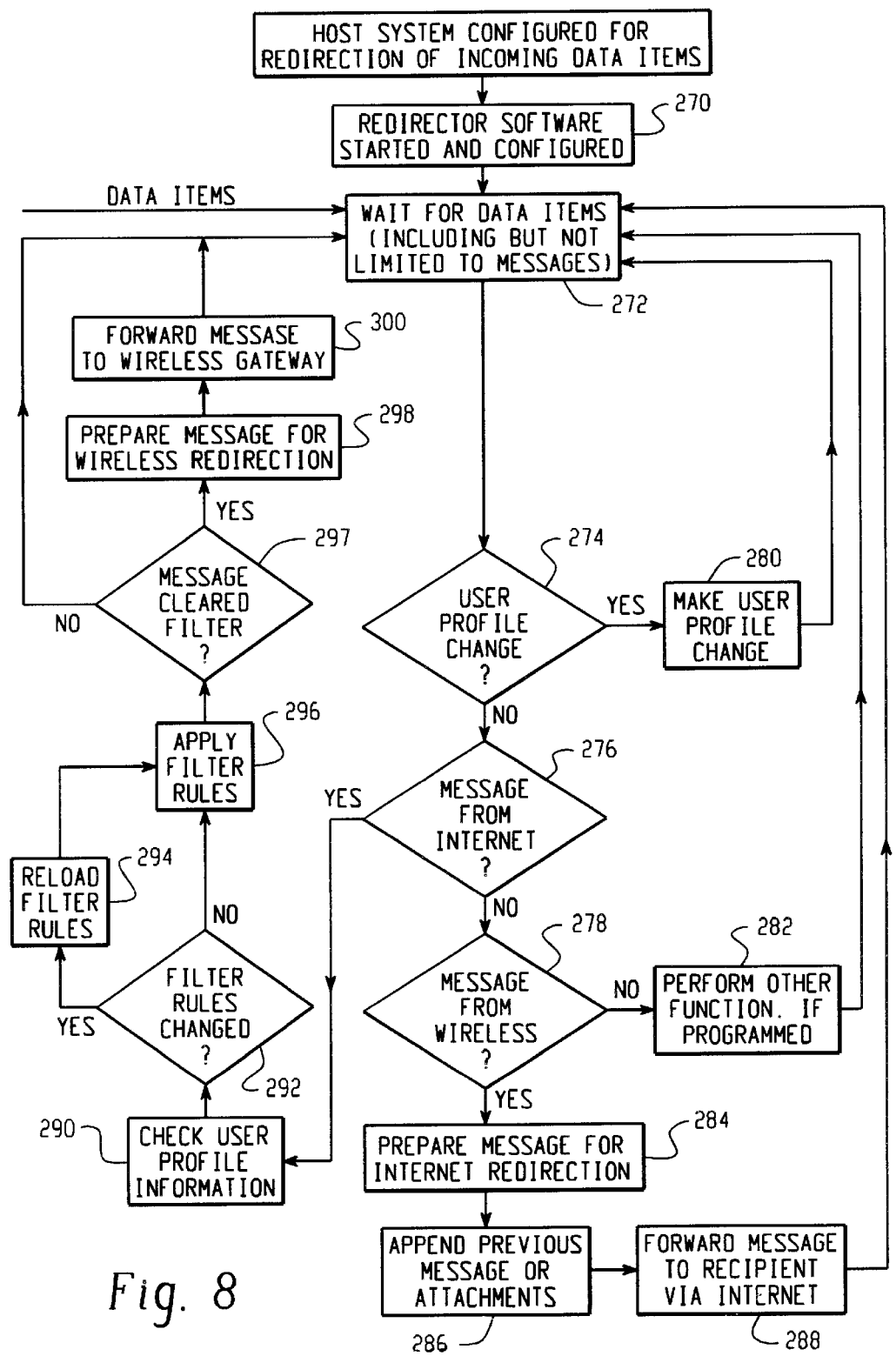
FIG. 8 is a flow chart showing the steps carried out by the redirector software operating at the wireless redirector host system.

Finally, turning to FIG. 8, a flow chart is set forth showing the steps carried out by the redirector program 242 operating at the redirector host system 240 shown in FIGS. 6 and 7. The basic steps carried out by the mobile communications device 220 in order to interface with the redirector host system 240 may be accomplished by substantially the same steps as shown in FIG. 5, although modified for this two-host aspect of the invention.

The flow chart in FIG. 8 assumes that the redirector program 242 has been activated and is operating. Additional configuration steps will be necessary to enable redirection services for a new messaging host system 230. These additional configuration steps include: (1) setting up a profile for the new messaging host system 230 indicating its address, etc. (2) setting up individual user profiles, (3) initiating default filtering rules for incoming messages from the messaging host system for the users, and (4) making available both the filtering rule 252 and user profile 256 web pages. The flow chart also assumes the necessary steps have been undertaken to configure the messaging host system 230 to forward a copy of all incoming messages to the redirector host system 240 (i.e., the Unix ".forward" file has been properly configured.)

Once the messaging host system 230 is configured 268 and the redirector program 242 is configured 270, the program 242 then waits for data items at step 272. As discussed earlier, data items need not be limited to E-mail messages but may also include signals that are representative of user profile changes or filtering rule changes.

When a data item is detected, the program determines at steps 274, 276 and 278 whether the data item is, respectively, a user profile change 274, a message from the Internet 276, or a message from the wireless mobile device 278. If the data item is a user profile change, then the appropriate user profile change is made at 280. Control then returns to step 272 where the program waits for additional data items. If the data item is a message from the Internet, then the appropriate user profile information is checked and applied at step 290. The program then checks if the filter rules have changed at step 292. If so, the filter rules are reloaded. Next, the filter rules are applied at step 296. If the message does not clear all applicable redirection filter rules at step 297, the preparation and redirection steps 298 and 300, respectively, are skipped. The message is thus ignored and control is returned to the redirector program 242 at step 272. Assuming, however, that the message (or at least a portion thereof) is to be redirected, then the message is prepared for redirection at step 298. In the preparation step 298, the redirector program 242 adds the outer envelope to the message for wireless transmission. At step 300, the repackaged message is then forwarded to the user's mobile device 220 via LAN 258, wireless gateway 260 and wireless network 222. Control then returns to step 272 where the program waits for additional data items to act upon.

If, at step 278, there is a determination that the data item is a message from the mobile device 220, then the message is prepared for Internet redirection at step 284. Preparation would preferably include changing the "from" and "reply to" fields of the message to replicate the address of the user's SMTP address at the messaging host system 230—the resulting message referred to as message B" in FIG. 6. Also, the preparation step may include making a second copy of the message, such message referred to as message B''' in FIG. 6. In this second copy, the "from" field is changed to, preferably, "Sent from the mobile device to Recipient" where 'Recipient' is the SMTP address of the recipient of message B". At step 286, previous messages or attachments are preferably appended. At step 288, one message is forwarded to the recipient (message B") and the copy of the message (message B''') is forwarded to the user's messaging host system 230 destined for the user's local data item store 236 for record keeping purposes. Control then returns to step 272, where the program waits for additional data items to act upon. If, at step 278, there is a determination that the data item is not a message from the wireless device, other functions may be performed by the redirector program 242 if so programmed to do so. For instance, the message could be a command message such as described earlier in this application where additional text of the E-mail message not previously transmitted to the device 220 may now be transmitted in its entirety.

Although not explicitly shown in the flowchart, if at step 276 there is a determination that the message is from the Internet, then the redirector program 242 would check whether the message is a re-redirected message from the messaging host system 230. If so, all-subsequent steps are skipped (the message is ignored) and control is returned to step 272. In this manner, re-redirected messages are not redirected to the mobile device 220. Alternatively implemented, this determination could be undertaken at step 296 as part of the default filtering rules. It is to be understood that the user profile and filtering rules could alternatively be combined together, thus eliminating a step(s). This is, of course, well within the scope of the present invention.

Although not shown, the additional step of maintaining the wireless data item store 248 is another step(s) that the redirector would preferably manage. At a predetermined storage threshold either by date or size, each user's earliest stored data item would be deleted to make room for newer incoming data items.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

What is claimed:

1. A method of transmitting electronic mail messages from a message sender to a message recipient having a wireless mobile data communication device, and of transmitting reply messages from the message recipient to the message sender, comprising the steps of:

addressing an original electronic mail message to a first electronic mail account associated with the message recipient, wherein the first electronic mail account is a memory store associated with a messaging host system coupled to a wide area wired network;

transmitting the original electronic mail message to the messaging host system and storing the original electronic mail message in the first electronic mail account;

generating a copy of the original electronic mail message, wherein the copy is addressed to a second electronic mail account associated with the wireless mobile data communication device;

forwarding the copy to a wireless redirector host system via the wide area wired network coupling the messaging host system to the wireless redirector host system, wherein the original electronic mail message remains stored in the first electronic mail account;

storing the copy in the second electronic mail account associated with the wireless mobile data communication device;

detecting the copy in the second electronic mail account and transmitting the copy from the wireless redirector host system to the message recipients' wireless mobile data communication device via a wide area wireless network;

generating a reply message to the copy at the wireless mobile data communication device and transmitting the reply message to the wireless redirector host system;

preparing two copies of the reply message at the wireless redirector host system and addressing a first copy of the reply message to the message sender and addressing a second copy of the reply message to the first electronic mail account; and transmitting the first copy of the reply message to the message sender via the wide area wired network and transmitting the second copy of the reply message to the messaging host server via the wide area wired network.

2. The method of claim 1, further comprising the steps of:

storing the second copy of the reply message in the first electronic mail account; and determining that the second copy of the reply message is not an original message addressed to the first electronic mail account and preventing the forwarding of the second copy of the reply message from the messaging host system to the wireless redirector host system.

3. The method of claim 1, further comprising the steps of:

prior to transmitting the first copy of the reply message to the message sender, configuring addressing information of the first copy so that the first copy of the reply message is addressed as originating from the first electronic mail account associated with the messaging host system.

4. The method of claim 1, further comprising the steps of:

accessing the first electronic mail account via a computer coupled to the messaging host system via the wide area wired network;

generating a reply message to the original electronic mail message stored in the first electronic mail account; and transmitting the reply message to the message sender.

5. A method of transmitting messages originating from a wireless device associated with a first electronic mail account maintained at a messaging host system, comprising the steps of;

generating an original message at the wireless device, wherein the original message is addressed to a message recipient;

transmitting the original message from the wireless device to a wireless redirector host system via a wireless network;

receiving the original message at the wireless redirector host system and preparing two copies of the original message, a first copy addressed to the message recipient, and a second copy addressed to the first electronic mail account maintained at the messaging host system, wherein the first copy is addressed as originating from the first electronic mail account and the second copy is addressed as originating from the wireless device; and transmitting the first copy from the wireless redirector host system to the message recipient and transmitting the second copy from the wireless redirector host system to the messaging host system where the second copy is stored in the first electronic mail account.

6. The method of claim 5, further comprising the steps of:

placing the original message in an electronic envelope addressed to a second electronic mail account maintained at the wireless redirector host system;

transmitting the electronic envelope from the wireless device to the wireless redirector host system and storing the electronic envelope in the second electronic mail account; and detecting the electronic envelope in the second electronic mail account at the wireless redirector host system and retrieving the original message from the electronic envelope.

7. The method of claim 5, further comprising the steps of:

detecting the second copy stored in the first electronic mail account;

determining that the second copy is a message originating from the wireless device; and preventing the messaging host system from forwarding the second copy back to the wireless redirector host system.

8. The method of claim 5, further comprising the steps of:

receiving a message at the first electronic mail account from an external source;

detecting the message in the first electronic mail account;

forwarding a copy of the message to the wireless redirector host system;

determining whether the message should be redirected from the wireless redirector host system to the wireless device; and if the message should be redirected, then packaging the message into an electronic envelope and transmitting the electronic envelope to the wireless device.

9. The method of claim 8, wherein the detecting step includes the steps of:

determining whether a new message has been received at the first electronic mail account; and checking a forwarding file coupled to the messaging host system to determine whether to redirect the new message to the wireless redirector host system.

10. The method of claim 9, wherein the forwarding file includes a list of system addresses where the new message should be forwarded by the messaging host system.

11. The method of claim 8, further comprising the steps of:

receiving the electronic envelope at the wireless device;

extracting the message from the electronic envelope; and storing the message within the memory of the wireless device.

12. The method of claim 5, further comprising the steps of:

configuring a set of filtering rules for use by the wireless redirector host system in determining whether messages should be redirected; and providing an access mechanism that allows a user of the wireless device to remotely configure and reconfigure the filtering rules.

13. The method of claim 12, wherein the access mechanism for remotely configuring and reconfiguring the filtering rules is a web-page interface.

14. The method of claim 5, further comprising the steps of:

configuring a user profile database for use by the wireless redirector host system in determining whether messages should be redirected; and providing an access mechanism that allows a system administrator of the messaging host system to remotely configure and reconfigure the user profile database.

15. The method of claim 14, wherein the access mechanism for remotely configuring and reconfiguring the user profile database is a web-page interface.

16. The method of claim 5, wherein the messages are E-mail messages, and the messaging host system is an E-mail host system.

17. The method of claim 5, wherein the wireless device is a laptop computer.

18. The method of claim 5, wherein the wireless device is a two-way paging computer.

19. The method of claim 18, wherein the two-way paging computer includes a wireless network interface for communicating with the wireless redirector host system via a wireless data network.

20. The method of claim 19, wherein the wireless redirector host system is coupled to the wireless data network via a wireless gateway system.

21. The method of claim 5, wherein the wireless device is a capable of voice and data communications.

22. The method of claim 5, wherein the messaging host system is an Internet Service Provider.

23. The method of claim 22, wherein the messages are E-mail messages, and the Internet Service Provider includes a mail server program.

24. The method of claim 23, wherein the Internet Service Provider further includes a forwarding database coupled to the mail server program for detecting whether a new message received at the mail server should be forwarded to a wireless redirector host system, and for determining the electronic address of that wireless redirector host system.

25. The method of claim 5, wherein the messaging host system and the wireless redirector host system are coupled via the Internet.

26. The method of claim 5, further comprising the steps of:

detecting a message for the user of the wireless device at the messaging host system;

forwarding a copy of the message from the messaging host system to the wireless redirector host system;

receiving the forwarded message at the wireless redirector host system and applying a set of user-defined filtering rules that determine whether or not to redirect the message to the user's wireless device via a wireless network coupled to the wireless redirector host system; and if the filtering rules determine that the message is of the type that should be redirected, then redirecting the message to the user's wireless device by packaging the message in an electronic envelope that includes the wireless network address of the user's wireless device.

27. The method of claim 26, further comprising the steps of:

providing a filter rules database for storing the user-defined filter rules; and providing an interface mechanism to the filter rules database through which the user may define and re-define the filtering rules.

28. The method of claim 27, wherein the interface mechanism is a web page interface.

29. The method of claim 28, wherein the web page interface includes an activation/deactivation switch for turning on/off the operation of the wireless redirector host system for a particular user.

30. The method of claim 5, wherein the original message is a reply message to a message received at the wireless device from the message recipient.

31. The method of claim 5, wherein the step of transmitting the original message from the wireless device to a wireless redirector host system further comprises the steps of:

transmitting the original message from the wireless device to a wireless gateway via the wireless network; and transmitting the original message from the wireless gateway to the wireless redirector host system.

32. The method of claim 5, wherein the messaging host system is a web-based E-mail hosting service.

33. A system for transmitting messages, comprising:

a wireless device for originating a message addressed to a message recipient, wherein the wireless device is associated with a first electronic mail account maintained at a messaging host system; and a wireless redirector host system for receiving the originated message via a wireless network from the wireless device, wherein the wireless redirector host system prepares two copies of the originated message, a first copy addressed to the message recipient, and a second copy addressed to the first electronic mail account maintained at the messaging host system, wherein the first copy is addressed as originating from the first electronic mail account and the second copy is addressed as originating from the wireless device; and wherein the wireless redirector host system transmits the first copy to the message recipient and transmits the second copy to the messaging host system where the second copy is stored in the first electronic mail account.

34. The system of claim 33, wherein the wireless device places the originating message in an electronic envelope addressed to a second electronic mail account maintained at the wireless redirector host system and transmits the electronic envelope to the wireless redirector host system, the electronic envelope being stored in the second electronic mail account; and wherein the wireless redirector host system detects the electronic envelope in the second electronic mail account and retrieves the originating message from the electronic envelope.

35. The system of claim 33, wherein the messaging host system detects the second copy stored in the first electronic mail account, determines that the second copy is a message originating from the wireless device, and is prevented from forwarding the second copy back to the wireless device.

36. The system of claim 33, further comprising:

an external source which transmits a message to the first electronic mail account;

the messaging host server detecting the message in the first electronic mail account and forwarding a copy of the message to the wireless redirector host system;

the wireless redirector host system determining whether the message should be redirected to the wireless device, and if the message should be redirected, then packaging the message into an electronic envelope and transmitting the electronic envelope to the wireless device.

37. The system of claim 36, wherein the messaging host system determines whether a new message has been received at the first electronic mail account and checks a forwarding file coupled to the messaging host system to determine whether to redirect the new message to the wireless redirector host system.

38. The system of claim 37, wherein the forwarding file includes a list of system addresses where the new message should be forwarded by the messaging host system.

39. The system of claim 33, further comprising:

a set of filtering rules configured for use by the wireless redirector host system in determining whether messages should be redirected; and an access mechanism that allows a user of the wireless device to remotely configure and reconfigure the filtering rules.

40. The system of claim 39, wherein the access mechanism for remotely configuring and reconfiguring the filtering rules is a web-page interface.

41. The system of claim 33, further comprising:

a user profile database configured for use by the wireless redirector host system in determining whether messages should be redirected; and an access mechanism that allows a system administrator of the messaging host system to remotely configure and reconfigure the user profile database.

42. The system of claim 41, wherein the access mechanism for remotely configuring and reconfiguring the user profile database is a web-page interface.

43. The system of claim 33, wherein the messages are E-mail messages, and the messaging host system is an E-mail host system.

44. The system of claim 33, wherein the wireless device is a laptop computer.

45. The system of claim 33, wherein the wireless device is a two-way paging computer.

46. The system of claim 45, wherein the two-way paging computer includes a wireless network interface for communicating with the wireless redirector host system via a wireless data network.

47. The system of claim 46, wherein the wireless redirector host system is coupled to the wireless data network via a wireless gateway system.

48. The system of claim 33, wherein the wireless device is a capable of voice and data communications.

49. The system of claim 33, wherein the messaging host system is an Internet Service Provider.

50. The system of claim 49, wherein the messages are E-mail messages, and the Internet Service Provider includes a mail server program.

51. The system of claim 50, wherein the Internet Service Provider further includes a forwarding database coupled to the mail server program for detecting whether a new message received at the mail server should be forwarded to a wireless redirector host system, and for determining the electronic address of that wireless redirector host system.

52. The system of claim 33, wherein the messaging host system and the wireless redirector host system are coupled via the Internet.

53. The system of claim 33, wherein wherein the messaging host system detects a message for the user of the wireless device and forwards a copy of the message to the wireless redirector host system;

wherein the wireless redirector host system receives the forwarded message and applying a set of user-defined filtering rules that determine whether or not to redirect the message to the user's wireless device via a wireless network coupled to the wireless redirector host system, and if the filtering rules determine that the message is of the type that should be redirected, then the wireless redirector host system redirects the message to the user's wireless device by packaging the message in an electronic envelope that includes the wireless network address of the user's wireless device.

54. The system of claim 53, further comprising:
a filter rules database for storing the user-defined filter rules; and
an interface mechanism to the filter rules database through which the user may define and re-define the filtering rules.

55. The system of claim 54, wherein the interface mechanism is a web page interface.

56. The system of claim 55, wherein the web page interface includes an activation/deactivation switch for turning on/off the operation of the wireless redirector host system for a particular user.

57. The system of claim 33, wherein the originating message is a reply message to a message received at the wireless device from the message recipient.

58. The system of claim 33, wherein the messaging host system is a web-based E-mail hosting service.

* * * * *

UNITED STATES PATENT AND TRADEMARK OFFICE
CERTIFICATE OF CORRECTION

PATENT NO. : 6,701,378 B2  Page 1 of 1
DATED : March 2, 2004
INVENTOR(S) : Barry J. Gilhuly et al.

It is certified that error appears in the above-identified patent and that said Letters Patent is hereby corrected as shown below:

Title page, Item [54] and Column 1, line 1,
Title, please replace "SYSTEM AND METHOD FOR PUSHING INFORMATION FROM A HOST SYSTEM TO A MOBILE DATA COMMUNICATION DEVICE" with -- SYSTEM AND METHOD FOR TRANSMITTING MESSAGES ORIGINATING FROM A WIRELESS DEVICE --

Title page,
Item [75], Inventors, please replace "Anh Ngoc Van" with -- Ngoc Ahn Van --

Column 25,
Line 1, please replace "claim 33, wherein" with -- claim 33, --

Signed and Sealed this

Twenty-fifth Day of May, 2004

JON W. DUDAS
*Acting Director of the United States Patent and Trademark Office*